US011337381B1

(12) United States Patent
Nelson et al.

(10) Patent No.: US 11,337,381 B1
(45) Date of Patent: May 24, 2022

(54) APPARATUS AND METHOD FOR DISCOVERY AND CONTROL OF INTERNET-OF-THINGS COMPONENTS FOR INDOOR AGRICULTURE AND CONTROLLED ENVIRONMENT SYSTEMS

(71) Applicant: Grow Computer, Inc., Brooklyn, NY (US)

(72) Inventors: Daniel Nelson, Brooklyn, NY (US); David McGee, Brooklyn, NY (US); Andrew Verhasselt, Hopkins, MN (US); Montique Willis, Brooklyn, NY (US)

(73) Assignee: Grow Computer, Inc., Brooklyn, NY (US)

( * ) Notice: Subject to any disclaimer, the term of this patent is extended or adjusted under 35 U.S.C. 154(b) by 314 days.

(21) Appl. No.: 16/582,155

(22) Filed: Sep. 25, 2019

Related U.S. Application Data

(60) Provisional application No. 62/736,227, filed on Sep. 25, 2018.

(51) Int. Cl.
*A01G 9/24* (2006.01)
*A01G 9/26* (2006.01)
(Continued)

(52) U.S. Cl.
CPC .............. *A01G 9/247* (2013.01); *A01G 7/04* (2013.01); *A01G 9/246* (2013.01); *A01G 9/249* (2019.05);
(Continued)

(58) Field of Classification Search
CPC .......... A01G 9/24; A01G 9/246; A01G 9/247; A01G 9/249; A01G 9/26; A01G 7/04; A01G 7/045
See application file for complete search history.

(56) References Cited

U.S. PATENT DOCUMENTS

| 4,742,475 A | * | 5/1988 | Kaiser | A01G 9/246 |
| | | | | 700/278 |
| 10,631,469 B2 | * | 4/2020 | Sahu | A01G 31/06 |

(Continued)

FOREIGN PATENT DOCUMENTS

| KR | 20090027279 A | * | 3/2009 |
| KR | 20170105402 A | * | 9/2017 |

(Continued)

*Primary Examiner* — Lisa L Tsang
(74) *Attorney, Agent, or Firm* — Mintz Levin Cohn Ferris Glovsky and Popeo, P.C.; Peter F. Snell, Esq.

(57) ABSTRACT

Some embodiments of apparatuses and methods according to the present invention control the growth of plants in indoor systems. In some embodiments, an electronic device is provided that wirelessly discovers, couples to and controls one or more peripheral devices, the one or more peripheral devices including one or more of a light for illuminating a grow, a water pump for supplying water to the grow, a fan for circulating air to the grow, an air pump for oxygenating water for the grow, a heater for increasing a temperature ambient to the grow, and a chiller for decreasing a temperature ambient to the grow. The electronic device may also wireless couple to one or more sensors, including one or more of a temperature sensor, camera, light sensor, pH sensor, electrical conductivity sensor, and/or any other environmental, plant, biology, water, electrical, light, and/or power sensor.

7 Claims, 19 Drawing Sheets

(51) Int. Cl.
*H04W 4/80* (2018.01)
*A01G 31/02* (2006.01)
*A01G 13/08* (2006.01)
*G06Q 50/02* (2012.01)
*A01G 27/00* (2006.01)
*A01G 7/04* (2006.01)

(52) U.S. Cl.
CPC ............... *A01G 9/26* (2013.01); *A01G 13/08* (2013.01); *A01G 27/003* (2013.01); *A01G 31/02* (2013.01); *G06Q 50/02* (2013.01); *H04W 4/80* (2018.02)

(56) References Cited

U.S. PATENT DOCUMENTS

| | | | | |
|---|---|---|---|---|
| 10,813,295 | B2 * | 10/2020 | Alexander | ............... A01G 5/00 |
| 2012/0215729 | A1 * | 8/2012 | Johnson | ................... G06N 3/12 |
| | | | | 706/45 |
| 2013/0006401 | A1 * | 1/2013 | Shan | ......................... A01G 9/24 |
| | | | | 700/90 |
| 2015/0089867 | A1 * | 4/2015 | Abbott | .................... H05B 47/16 |
| | | | | 47/58.1 LS |
| 2016/0050862 | A1 * | 2/2016 | Walliser | .................. A01G 31/02 |
| | | | | 47/62 E |
| 2016/0143228 | A1 * | 5/2016 | De Groot | ............... A01G 31/02 |
| | | | | 700/284 |
| 2016/0345516 | A1 * | 12/2016 | Britt | ....................... A01G 25/167 |
| 2018/0014486 | A1 * | 1/2018 | Creechley | .............. H04N 7/183 |
| 2018/0279563 | A1 * | 10/2018 | Wolfe | .................... A01G 25/02 |
| 2018/0359947 | A1 * | 12/2018 | Millar | ..................... A01G 9/246 |
| 2018/0359948 | A1 * | 12/2018 | Millar | .................. H05K 7/1479 |
| 2018/0359955 | A1 * | 12/2018 | Millar | .................. A01G 31/042 |
| 2020/0022316 | A1 * | 1/2020 | Millar | .................... A01G 9/029 |

FOREIGN PATENT DOCUMENTS

| | | | | |
|---|---|---|---|---|
| KR | 102068131 B1 * | 1/2020 | | |
| WO | WO-2016138075 A1 * | 9/2016 | ............. | A01G 31/06 |
| WO | WO-2017176733 A1 * | 10/2017 | ............. | G06Q 10/06 |

* cited by examiner

APPARATUS AND METHOD FOR DISCOVERY AND CONTROL OF INTERNET-OF-THINGS COMPONENTS FOR INDOOR AGRICULTURE AND CONTROLLED ENVIRONMENT SYSTEMS

CROSS-REFERENCE TO RELATED APPLICATION

This claims the benefit of priority to U.S. Provisional Patent Application No. 62/736,227, filed Sep. 25, 2018, which is hereby incorporated by reference herein in its entirety.

TECHNICAL FIELD OF THE INVENTION

The present invention relates generally to the field of indoor and controlled environment agriculture (CEA). Embodiments of apparatuses and methods according to the present invention help indoor farmers, growers, tinkerers, researchers, students, entrepreneurs and/or other hobbyist or do-it-yourself (DIY) growers more effectively grow plants in an indoor growing system using methods for peripheral device discovery and a structured, data-driven and programmatic approach to using and/or programming recipes for controlling a wide range of peripheral devices involved in the grow process.

BACKGROUND OF THE INVENTION

Earth must figure out how to grow more food, since there will likely be over 10 billion people living on it by 2050. Some estimates have said we will need to grow 75% more food than we currently produce worldwide, but we are already running out of arable land. Additionally, the externalities of global climate change can fundamentally alter the consistency of crop yields, causing potential disruptions to global and local food systems.

Population trends show that humanity is becoming more urbanized, with up to 70% of humans projected to live in a city by 2500. This urbanization is driving the innovation of an indoor farming sector that is creating new kinds of farms. These present unique opportunities to produce fresh and local food such as plants, mushrooms, insects, fish, livestock and others within city limits by using currently available components.

In cities around the world, more entrepreneurs and farmers are turning to controlled environment agriculture (CEA) to help increase yields and otherwise maximize efficiency. CEA allows year-round food production and gives the grower full control of the environmental variables of the system. This allows the grower to create optimized growing conditions, year-round, while situated nearby end consumers. By removing the externalities of growing outside, where crops are exposed to weather, farmers do not have to worry about drought, frost, heat, or most pests. Farmers with the ability to control light, temperature, humidity, CO2, nutrients, air flow, and other environmental controls have been able to greatly increase plant yields as well as test new growing paradigms to improve other efficiencies and enhance flavors.

One driver of indoor agriculture has been the exponential reduction in cost of light-emitting diode (LED) technology. Haitz's law (AKA Moore's law for LEDS) has projected that "every decade, the cost per lumen (unit of useful light emitted) falls by a factor of 10, and the amount of light generated per LED package increases by a factor of 20, for a given wavelength (color) of light." In practical terms, the costs of LEDs drop every 18 months while they double in power. These changes have led to an economic inflection point so that certain crops can now be grown indoors, locally to their end consumers, at a price comparable to those generated using traditional field agriculture.

With the decreased cost and improved quality of lighting technology, there has been an explosion of new types of indoor growing systems, such as hydroponics, aeroponics, and aquaponics. These systems offer new ways to deliver local, fresh produce within cities around the world. One key hydroponics sales pitch is that it uses 70-90% less water than traditional field agriculture.

With the development of these technologies as well as new economic opportunities of growing competitively priced and high-quality crops indoors, there has been a follow-on of investment. In 2017 alone, indoor hydroponic companies received over $300 million of venture investments, headlined by over $200 million going to California startup Plenty, and over $100 million invested in Aerofarms in New Jersey.

A new generation of farmers are discovering new opportunities to grow food indoors in cities and ultimately create sustainable indoor farm businesses. For example, in New York City alone, there are over 30 different urban farms, with the majority of these being indoor, CEA operations. Two notable examples are Square Roots, which is an urban-farming accelerator using shipping container farms to grow high-quality leafy greens in the city, and Farm. One, which produces high-quality and local produce and rare herbs for chefs from two indoor, LED-powered farms in a basement and a spare room in a culinary school in NYC.

In addition to food production, the exponential drop in LED lighting technology has helped drive the growth of the *cannabis* market, with the total market expected to double between 2017 and 2021. This market has been driven by loosening of *cannabis* laws in states such as California, Oregon, Colorado, Vermont, Massachusetts, and others. Because of the short growing seasons in many of these states, much growing is done indoors in controlled environments. There is a tremendous amount of overlap in the products and technology that is used to grow food or grow *cannabis*, and when you walk into a hydroponic garden center, you often see the same products being sold to both types of farmers. Thus, the economic benefits of creating new *cannabis*-growing technology can bring down costs of creating healthy food at the same time.

Despite the presence of hydroponic farmers and entrepreneurs in the space, there is a lack of connectivity between any of the control systems and components that exist in any grow. As a matter of design, every grower's system can be totally unique in the presence and configuration of the exact hardware components. There currently is no solution that can enable the grower to connect to all of the individual devices to operate them in a connected and coordinated manner.

Currently many of these devices are built with "smart", IoT capabilities, however each individual hardware company chooses one 'spectrum' and builds their own back end software to connect to the internet or other cloud-enabled services. There are 7 primary spectrums that these devices use: Wi-Fi, Bluetooth, Z-wave, Zigbee, X-bee, Lora and Thread, and it is impossible for devices to be inter-connected if they are on different spectrums. Additionally, each company has developed its own 'API' (Application Programming Interface) that enables it to communicate with outside services or data sources. The challenge is that each API is unique in its design, data model and capabilities and does not easily interact or interface with other components from other manufacturers.

In order for any hardware company to manage any of these interconnections, it must manage a complex and extensive mapping of other peripheral hardware based on "many-to-many" relationships of managing many individual connections on a one on one basis. Right now, with the current state of IoT software and platforms available, any component cannot easily talk to any other component. In order to give the grower access to everything in one place, they would need to manage interconnections to every other device in the market.

With the lack of technology, growers and farmers are forced to buy either inoperable or analog products that do not meet the goals of even the most basic Internet of Things (IoT) devices. Many end up using manual outlet timers, analog sensors, and entire ranges of lights, fans, and pumps with only on/off features, making smart growing difficult or impossible. There is thus a world of data that is not captured in CEA that could lead to new improvements, innovations, and economic opportunities.

SUMMARY OF SOME EMBODIMENTS OF THE INVENTION

Some embodiments of the present invention provide apparatuses and methods that serve as the operating system that manages the "roads and bridges" for all components (e.g., peripheral devices including sensors and other devices) to communicate with each other seamlessly within the context of, for example, and indoor and controlled environment agriculture (CEA) grow. For example, instead of the industry managing ever changing interconnections of APIs and data protocols, peripheral devices may connect one-to-one with an electronic device that can communicate with all such peripheral devices. In accordance with some embodiments of the present invention, this electronic device is sometimes referred to herein as the "Grow Computer" or "GrowHub" or "Gateway". In some embodiments of the present invention, the electronic device may utilize standard APIs for hardware companies to connect, and a SDK for software companies to seamlessly connect to everything else in these spaces. By going from many-to-many to one-to-one, transaction and development fees and expenditure of resources on each new grow or farming operation can be significantly reduced. Standardized data and business terms in a digital market can also open up exciting new market opportunities with increased efficiencies gained.

In some embodiments of the present invention, an electronic device is provided that includes one or more wireless communication interfaces (e.g., Wi-Fi, Bluetooth, Z-wave, Zigbee, X-bee, Lora, Thread, TCP/IP, 3G, 4G, and 5G) configured for coupling to one or more peripherals, the one or more peripheral devices comprising at least one of a light for illuminating a grow, a water pump for supplying water to the grow, a fan for circulating air to the grow, an air pump for oxygenating water for the grow, a heater for increasing a temperature ambient to the grow, and a chiller for decreasing a temperature ambient to the grow. For example, each of the above peripheral devices may communicate with the electronic device using different one(s) of the electronic device's wireless communication interfaces or via direct, wired connections. The electronic device may further include one or more processors configured to control the one or more peripheral devices via the one or more wireless communication interfaces.

In some embodiments of the present invention, an electronic device and corresponding method are provided for automatic control of an indoor agriculture growing environment over a life cycle of a grow. The electronic device may include one or more wireless communication interfaces configured to couple wirelessly to a plurality of peripheral devices of an indoor agriculture growing environment, the plurality of peripheral devices comprising at least two of a light for illuminating a grow, a water pump for supplying water to the grow, a fan for circulating air to the grow, an air pump for oxygenating water for the grow, a heater for increasing a temperature ambient to the grow, and a chiller for decreasing a temperature ambient to the grow. Again, in some embodiments, each of the above peripheral devices may communicate with the electronic device using different one(s) of the electronic device's wireless communication interfaces. The electronic device may further include memory configured to store computer program instructions comprising a recipe identifying environmental conditions for the grow and for automating over a life cycle of the grow the control of the plurality of peripheral devices via the one or more wireless communication interfaces. In addition, the electronic device may include one or more processors coupled to the memory and configured to execute the computer program instructions of the recipe to automatically control the plurality of peripheral devices over the life cycle of the grow via the one or more wireless communication interfaces.

In some embodiments, the electronic device is further configured such that the one or more wireless communication interfaces couple wirelessly to one or more sensors (e.g., at least one of a temperature sensor, camera, light sensor, pH sensor, humidity or moisture sensor, oxygen sensor, $CO_2$ sensor, electrical conductivity sensor, environmental sensor, plant sensor, biology sensor, water sensor, electrical sensor, and power sensor). In some embodiments, the recipe may utilize information received from the one or more sensors, and the one or more processors may be configured to execute the computer program instructions of the recipe to control, based at least in part on the information received from the one or more sensors, the plurality of peripheral devices via the one or more wireless communication interfaces.

For example, in some embodiments of the present invention, the one or more sensors includes a temperature sensor. A corresponding grow recipe would include computer instructions for achieving a predetermined temperature at a particular time, and based at least in part on temperature information received by the one or more processors from the temperature sensor, the one or more processors may be configured to automatically control at least one of the heater for increasing a temperature ambient to the grow and the chiller for decreasing a temperature ambient to the grow.

As another example, in some embodiments of the present invention, the one or more sensors includes a humidity or moisture sensor, the recipe includes computer program instructions for achieving a predetermined humidity at a particular time, and based at least in part on humidity information received by the one or more processors from the humidity or moisture sensor, the one or more processors may be configured to automatically control the water pump for supplying water to the grow.

In some embodiments, the plurality of peripheral devices includes a light for illuminating a grow, a water pump for supplying water to the grow, a fan for circulating air to the grow, and at least one of a heater for increasing a temperature ambient to the grow and a chiller for decreasing a temperature ambient to the grow. The memory of the electronic device may be configured to store computer program instructions including the recipe identifying environmental conditions for the grow and for automating over a life cycle of the grow the control of the plurality of peripheral devices via the one or more wireless communication interfaces. The computer instructions may automatically perform one or more (e.g., all of) the following operations at specific times over the life cycle of the grow or under specific conditions during the life cycle of the grow: turning on and off the light for illuminating the grow; turning on and off the water pump for supplying water to the grow; turning on and off the fan for circulating air to the grow; and turning on and off the at least one of a heater for increasing a temperature ambient to the grow and a chiller for decreasing a temperature ambient to the grow (e.g., wherein turning on a peripheral device includes supply power to the device previously in an "off" state and/or regulating the extent to which the peripheral is operating). The one or more processors coupled to the memory may be configured to execute the computer program instructions of the recipe to control the plurality of peripheral devices over the life cycle of the grow via the one or more wireless communication interfaces.

In some embodiments of the present invention, an electronic device and corresponding method are provided for automatic control of an indoor agriculture growing environment. The electronic device may include computer memory and a plurality of wireless communication interfaces comprising one or more of (e.g., at least two, three, four, five or all) of WiFi, Bluetooth, Zigbee, Xbee, TCP/IP, 3G, 4G, 5G, and LoRa (e.g., at least two of WiFi, Bluetooth, Zigbee, Xbee, and LoRa). The electronic device may be configured to receive via the plurality of wireless communication interfaces, prior to the electronic device wirelessly pairing with a plurality of peripheral devices comprising at least two of a light for illuminating a grow, a water pump for supplying water to the grow, a fan for circulating air to the grow, an air pump for oxygenating water for the grow, a heater for increasing a temperature ambient to the grow, and a chiller for decreasing a temperature ambient to the grow, a pre-pairing data signal from each of the at least two peripherals identifying one or more of (e.g., at least two, three, four or all of) the device manufacturer, version, device type, distance, battery life, timestamp information, and/or other device identifying information. The electronic device may further include one or more processors coupled to the computer memory and configured to store in the computer memory a registry of all of the plurality of peripheral devices for which the pre-pairing data signal is received via the a plurality of wireless communication interfaces.

In some embodiments, based at least in part on the plurality of peripheral devices identified in the registry, the one or more processors is configured to run computer program instructions including a recipe identifying environmental conditions for the grow and for automating over a life cycle of the grow the control of the plurality of peripheral devices via the one or more wireless communication interfaces.

In some embodiments, the one or more processors is configured to communicate with a server storing a plurality of recipes, and the one or more processors is configured to download the computer program instructions comprising the recipe for use with the plurality of peripheral devices from the server (e.g., downloading a recipe that matches the profile of peripheral devices with which the electronic device has communicated and are identified in a registry associated with the electronic device).

In some embodiments, subsequent to receiving the pre-pairing data signal for each of the plurality of peripheral devices, the one or more processors is configured to assign a unique identifier to each of the plurality of peripheral devices.

In some embodiments, the one or more processors is configured to store each of the unique identifiers in the computer memory.

In some embodiments, the one or more processors is configured to wirelessly transmit each of the unique identifiers to the corresponding peripheral device.

In some embodiments, the one or more processors is configured to run the computer program instructions for controlling the plurality of peripheral devices after pairing with the plurality of peripheral devices via the one or more wireless communication interfaces.

In some embodiments, the one or more processors is configured to receive via one of the plurality of wireless communication interfaces an additional pre-pairing data signal from an additional peripheral device, the additional pre-pairing data signal identifying one or more of (e.g., at least two, three, four and/or all of) the device manufacturer, version, device type, distance, battery life, timestamp information, and/or additional device information for the additional peripheral device. The one or more processors may be further configured to store in the computer memory registry information regarding the additional peripheral device. In addition, the one or more processors may be further configured to identify and run new computer program instructions comprising a new recipe identifying environmental conditions for the grow and for automating over a life cycle of the grow the control of the plurality of peripheral devices and the additional peripheral device via the one or more wireless communication interfaces.

In some embodiments, the one or more processors may be configured to identify and run new computer program instructions comprising the new recipe subsequent to providing information regarding the additional peripheral device to a server storing a plurality of recipes and downloading the new computer program instructions comprising the new recipe from the server.

The foregoing examples are only illustrative and the additional implementations and details are within the scope of other embodiments of the present invention. For example, in some embodiments of the present invention, the electronic device further includes memory configured to store computer program instructions including a recipe for powering peripherals on and off. The one or more processors may be configured to execute the computer program instructions to selectively enable power to a plurality of outlets (e.g., outlets integrated as part of the electronic device).

In some embodiments, an electronic device is provided that includes a housing and one or more outputs configured for coupling to one or more peripherals, the one or more peripherals generally include many of: a light for illuminating a grow, a water pump for supplying water to the grow, a fan for circulating air to the grow, an air pump for oxygenating water for the grow, a heater for increasing a temperature ambient to the grow, and a chiller for decreasing a temperature ambient to the grow. The electronic device also includes one or more processors within the housing, the one or more processors configured to selectively enable or disable and/or control the one or more peripherals by controlling the one or more external outputs.

In some embodiments, the computer program instructions include a recipe for controlling the powering on and off of all of the lights and illumination hardware within a grow, the water pump for supplying water to the grow, the fan for circulating air to the grow, the air pump for oxygenating water for the grow, the heater for increasing a temperature ambient to the grow, and the chiller for decreasing a temperature ambient to the grow. The one or more processors may be configured to execute the computer program instructions to selectively enable power to two or more of the plurality of outlets to control power to the peripherals.

In some embodiments, the electronic device further includes one or more wired or wireless connections configured for coupling to one or more sensors. In some embodiments, these inputs enable two-way communication and enable the electronic device to control the sensors. The one or more sensors may include (e.g., all) of a temperature sensor, camera, light sensor, pH sensor, and electrical conductivity sensor. The one or more sensors may include at least one (e.g., all) of an environmental, plant, biology, water, electrical, light, and power sensor. In some embodiments, the one or more inputs connect to the sensors via one of, for example, 7 wireless protocols (Wi-Fi Blue Tooth, Z-wave, Zigbee, X-bee, Lora and Thread).

In some embodiments, the electronic device further includes memory for storing environmental data collected by the one or more sensor(s). In some embodiments, the electronic device further includes memory for storing at least one of results by time and data indicating the status of the one or more outputs over time.

In some embodiments, the device is able to connect to outside peripherals that are able to program smart outlets or specific circuits and can sense power provided to each one of the one or more outputs via wireless protocol.

In some embodiments, the electronic device further includes one or more power-sensing sensors built into electrical management devices for sensing power provided to all of the one or more outputs to determine the total power consumption of all peripherals coupled to the electronic device.

In some embodiments, the electronic device further includes a network interface for communication with another device on the same local network.

In some embodiments, the electronic device includes a network interface for communication with a web server over the Internet. In some embodiments, the one or more processors of the electronic device is configured to download, via communication with the web server over the Internet, computer program instructions comprising a recipe for controlling the one or more peripherals.

In some embodiments, apparatuses and methods according to the present invention receive and process one or more environmental sensor inputs through central computer hardware and selectively enable one or more outputs including, for example, outbound alternating current (AC) power circuits, to control coupled (e.g., plugged in) lights, pumps, heating, ventilation, and/or air conditioning devices, and/or other actuators or devices. In some embodiments, the apparatuses and methods run unique climate recipes, which, for example, may be pre-installed on a control device or accessed by the control device via download over a connected network, and which may govern the control of coupled devices according to particular sensor-based, time-based, and/or other rules. In some embodiments, the apparatuses and methods described herein enable end-user programming and/or sharing of unique climate recipes for controlling devices coupled to apparatuses described herein.

The foregoing description and summary is by way of example only and is non-limiting, and additional embodiments of the present invention are described below.

BRIEF DESCRIPTION OF THE DRAWINGS SHOWING NON-LIMITING EMBODIMENTS

Like reference symbols or numerals in the figures indicate like elements.

DETAILED DESCRIPTION OF SOME EMBODIMENTS OF THE INVENTION

Figure 1:
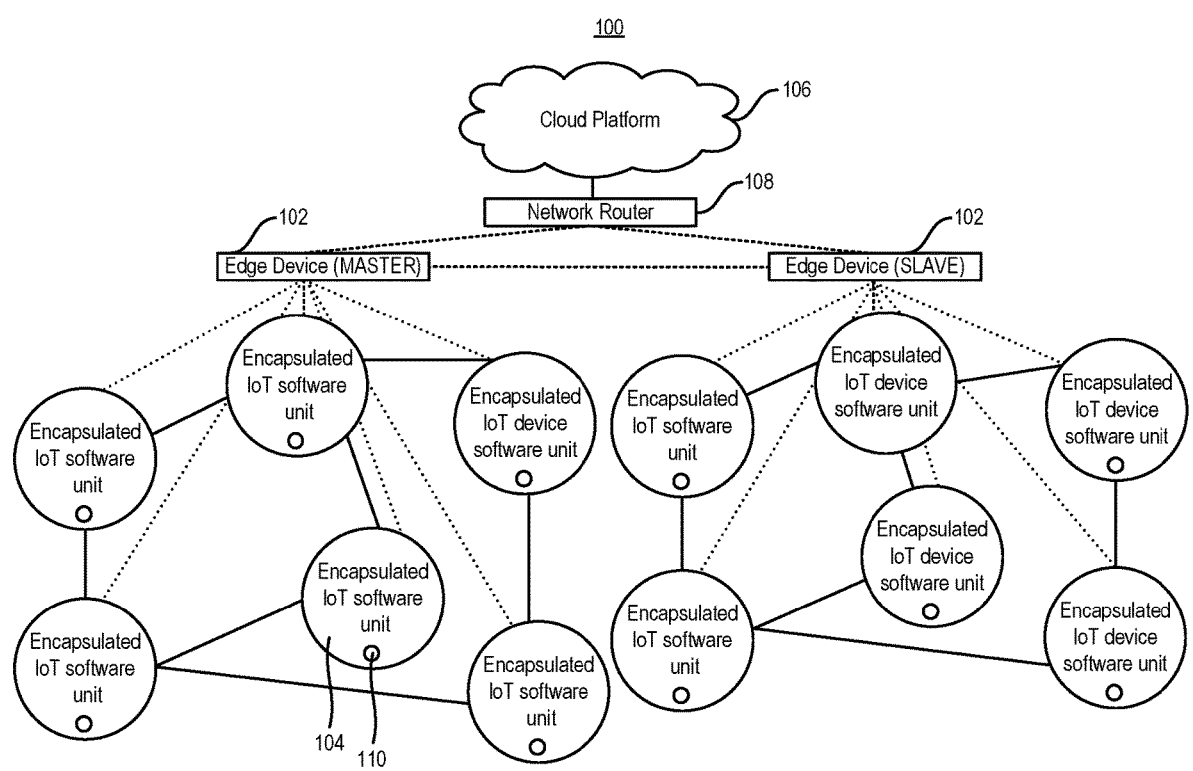
FIG. 1 is a block diagram of an architecture for an indoor and controlled environment agriculture (CEA) grow system according to some embodiments of the present invention.

FIG. 1 is a block diagram of an architecture for an indoor and controlled environment agriculture (CEA) grow system 100 according to some embodiments of the present invention. In some embodiments, an electronic device 102 for controlling a grow may be provided that may connect (e.g., wireless and/or by wired connection) to one or more Internet-of-Things (IoT) peripheral devices 104. Electronic device 102 may be an edge device that provides access to cloud platform 106 via network router 108 or by other means. The network of connected IoT devices 104 may include multiple electronic devices 102 in communication with one another. In some embodiments, one or more of such electronic devices 102 may be a master device and another one or more of such electronic devices 102 may be slave devices. In some embodiments, the smaller dots 110 within each IoT peripheral device 104 may represent the base code for any radio or web-enabled IoT device. The larger dots (generally denoted 104) may be "EISU" node addresses and the connecting lines may be the EISU protocol data, described further below.

Figure 2:
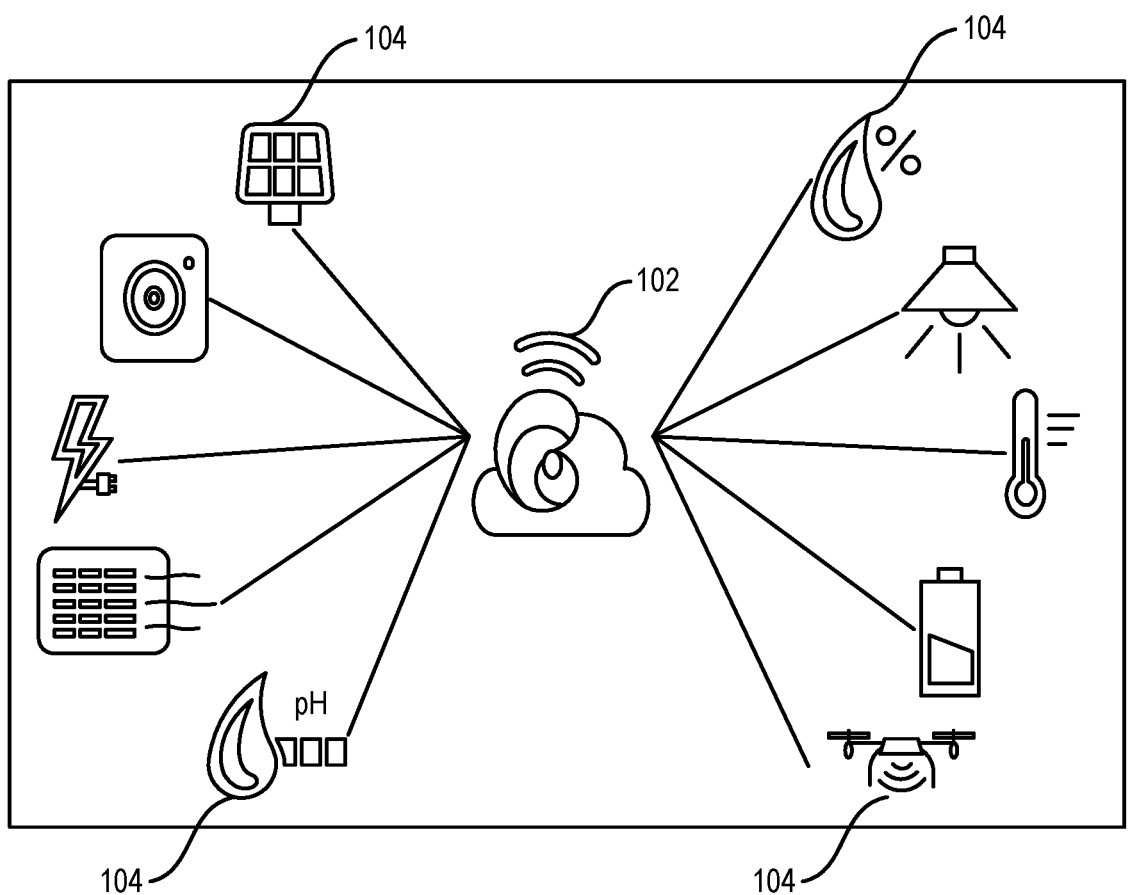
FIG. 2 is a diagram illustrating connection of an electronic device to a plurality of IoT devices according to some embodiments of the present invention.

FIG. 2 is a diagram illustrating connection of an electronic device 102 to a plurality of IoT devices 104. Such IoT peripheral devices 104 may include, for example, light(s) for illuminating a grow, water pump(s) for supplying water to the grow, fan(s) for circulating air to the grow, air pump(s) for oxygenating water for the grow, heater(s) for increasing a temperature ambient to the grow, and chiller(s) for decreasing a temperature ambient to the grow, and/or one or more sensors, as is described in greater detail below.

Some embodiments of the present invention described herein are sometimes referred to as "Grow Computer" or "GrowHub" or "Gateway". In some embodiments, Grow Computer together with its cloud-based architecture is the IoT technology platform that powers indoor agriculture.

In some embodiments, the Grow Computer ecosystem includes one or more apparatuses, including, for example, smart hardware as described herein. In some embodiments, this smart hardware is combined with, for example, open-source software and a cloud-based architecture, to deliver new data and artificial intelligence (AI) capabilities to farmers, growers, enthusiasts, researchers, and students.

Figure 3:
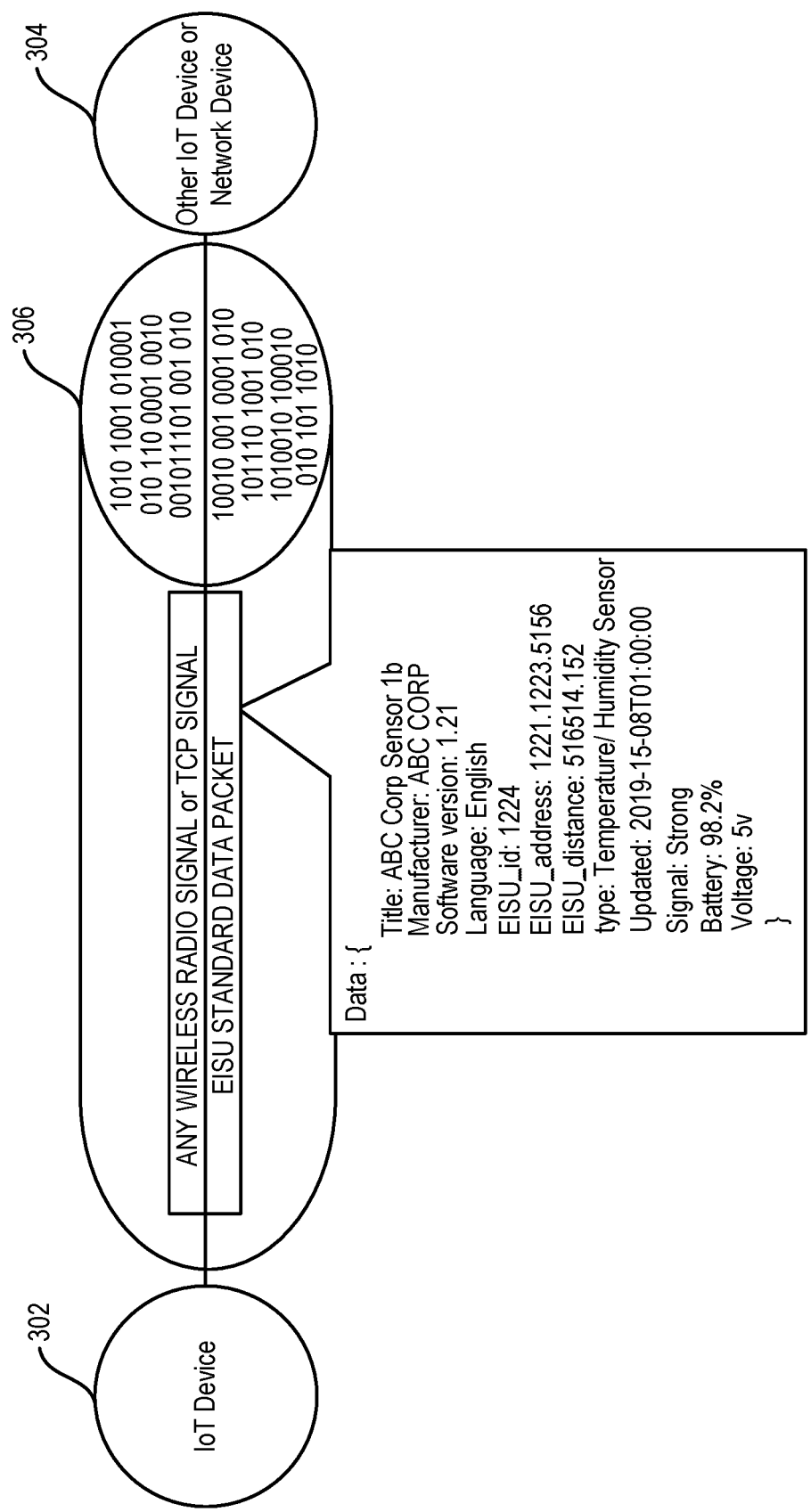
FIG. 3 is a diagram illustrating a mechanism for allowing an electronic device according to some embodiments of the present invention to discover IoT peripheral devices before wirelessly pairing with those devices according to some embodiments of the present invention.

FIG. 3 is a diagram illustrating a mechanism for allowing an electronic device according to some embodiments of the present invention (e.g., 102) to discover IoT peripheral devices (e.g., 104) before wirelessly pairing with those devices. In some embodiments, a completely agnostic protocol network requires a data packet to be embedded in any TCP or radio signal and transmitted from an IoT device (e.g., device 104) to another IoT device, (edge) network computer or gateway device (e.g., device 102). The protocol allows access to source IoT device data prior to a pairing process. The protocol may be streamed along with radio frequencies as binary code with additional metadata generated from embedded EISU SDK software. Data such as, for example, one or more of (e.g., all of) source manufacturer, radio signal and version, distance, battery life, device type and last update timestamps, may broadcasted for the purpose of creating peer-to-peer networking with other IoT devices. Once connected, the device may be provisioned on the EISU grid. The IoT device may receive both an assigned identification tag and a persistent EISU address registered with listening peers, as well as the triangulation and trilateration from the listener edge device and peers to create optimal telemetry data. Once provisioned to the grid of other EISU addressed devices, the IoT device may be able to define its relationship, purpose, capabilities and functionality to all listeners. This may be to enable automatic grouping of IoT devices without regard to which radio signals those devices used to connect to the EISU grid. This may allow for an efficient manner of operating contextual IoT networks where each IoT device operates in concert with others. The EISU grid can gather data of its nodes every second and can report that data back to a remote server for additional processing and analysis on a machine learning server. Using the EISU, API and SDK programmers can add custom software and processing for their own purposes. In some embodiments, the EISU Protocol information may be sent from a source device 302 with embedded SDK software with the radio signal to a destination device 304 as a binary data packet 306.

As used herein, "IoT Device" generally refers to an internet of things device, which includes a hardware device with embedded software.

As used herein, "EISU" generally refers to Encapsulated IoT Software Unit created for current and future WAN, LAN and radio-enabled devices. EISU may be made of 5 parts: the protocol, the node and the grid, the API, and the SDK.

As used herein, "EISU protocol" generally refers to the data packet and algorithm that is layered into individual IoT device radio signals or protocols to report telemetry information, signal strength, battery and normalized data and/or other relevant metadata prior to pairing with a gateway device, as shown in FIG. 3. The protocol may be transmitted with radio signals as binary data to any listening EISU node.

As used herein, "EISU node/IoT device" generally refers to the packet of data attached to an IoT device and its radio signal of choice, e.g., (Wifi (802.11a/b/g/n/ac), Bluetooth, Zigbee/Xbee, Zwave, TCP/IP, 3g/4g/5g, LoRa) that exists on the EISU grid. The IoT device may be updated with the protocol and may be able to join any EISU grid that requires it.

As used herein, "EISU grid" generally refers to a highly relational graph-based data repository of peer-to-peer EISU nodes (IoT devices) connected by various radio and TCP signals within a space, as shown in FIG. 1. Trilateration and Triangulation algorithms may help to create a map of geolocated nodes on the grid after 2 or more nodes exist on the grid, as shown and described for example in connection with FIG. 4. EISU grids can be scaled to fit any given space and report grid integrity along with the diagnostics of any of the connected EISU nodes. The connecting edge devices and/or IoT devices can be provided with listening protocols. All of this data can be transferred via TCP to a remote server for control, monitor and maintenance of the grid. The grid can continue to use the radio signals to report data after connection.

As used herein, "EISU SDK" generally refers to Software Development kits written in one or more (e.g., multiple) programming languages as packages to be embedded into IoT devices (e.g., C++, Python, Javascript, and Rails.)

As used herein, "EISU Application Program Interface" generally refers to an API that allows the metadata to be accessed by any developer seeking to create extended applications or graphical user interfaces with the metadata generated by the EISU grid for any purpose. In addition, it allows access to the global repository of IoT devices.

Figure 4:
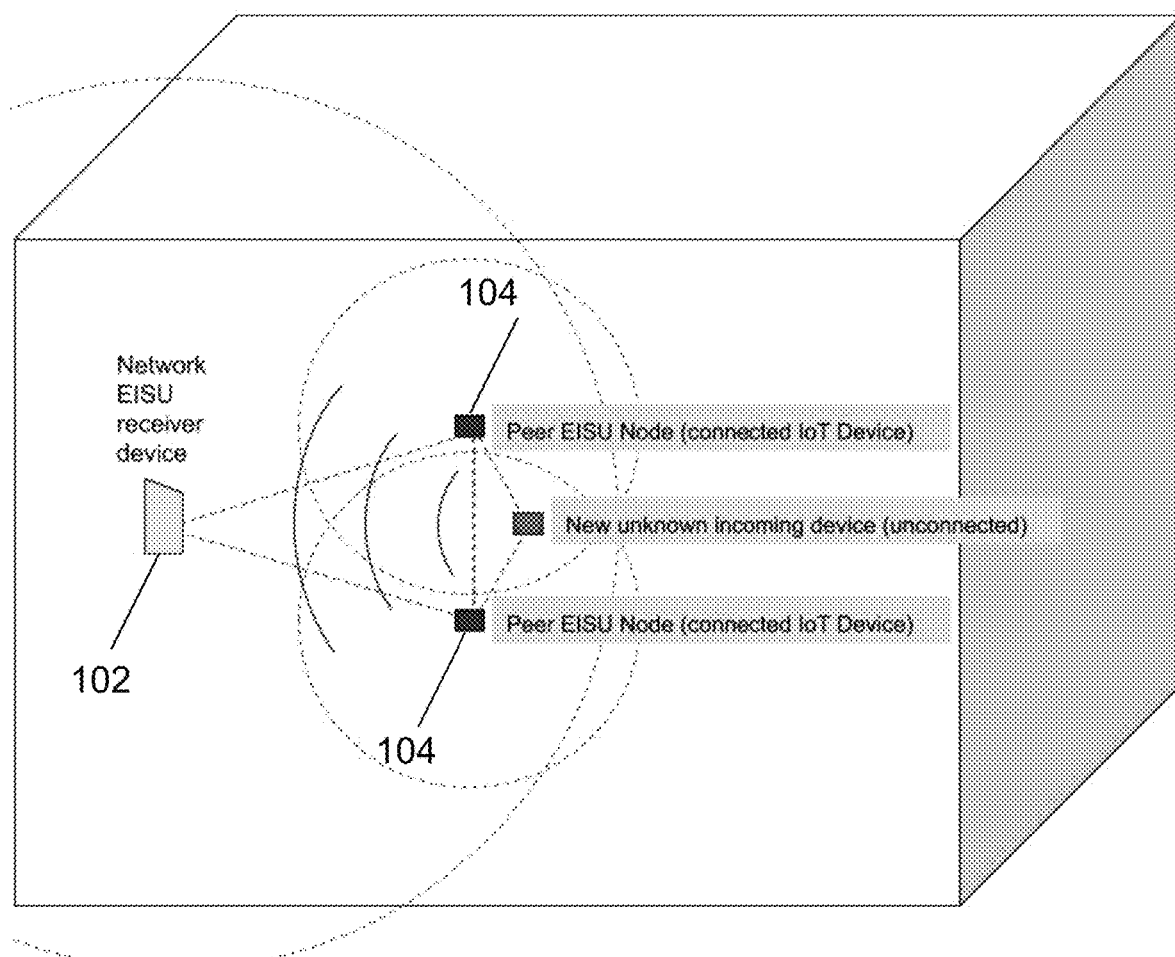
FIG. 4 illustrates an Encapsulated IoT Software Unit ("EISU") Detection Method, including EISU Protocol plus a Telemetry, Triangulation and Trilateration algorithm according to some embodiments of the present invention.

FIG. 4 is an EISU Detection Method, including EISU Protocol plus a Telemetry, Triangulation and Trilateration algorithm according to some embodiments of the present invention. In some embodiments, an electronic device 102 detects indoor addresses of IoT devices 104 in any given space. The dotted lines represent the radio field of the device.

Figure 5:
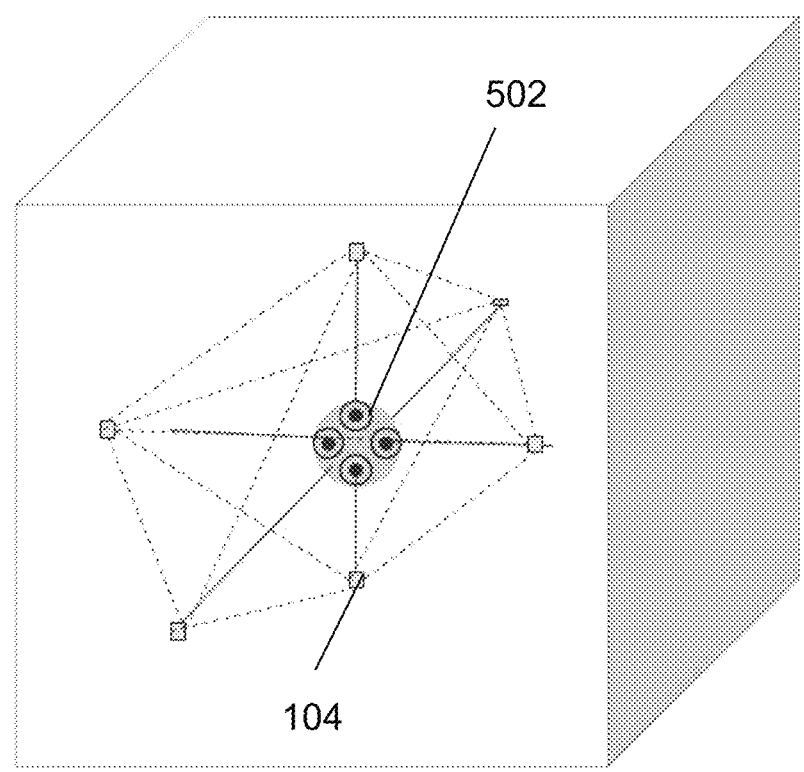
FIG. 5 illustrates an EISU indoor scanner according to some embodiments of the present invention.

FIG. 5 shows an EISU indoor scanner according to some embodiments of the present invention. In some embodiments, the EISU indoor scanner 502 (e.g., incorporated as part of an electronic device 102) may include a hardware device used for design and calibration of IoT within any given space. The scanner may include, for example, a 3D Camera (sphere), laser (lines), EISU protocol (dotted lines), emf meter and geomagnetic meter detecting IoT devices 104 (squares) located in any given space. The lasers and 3-dimensional camera with built-in EISU protocol may be used for the purpose of indoor mapping of IoT devices. The scanner 502 may be able to detect obstructive objects in a 3-dimensional space and the laser may detect range and distance from the scanner. The EISU nodes within the grid may be merged with image, and laser data for a 3-dimensional representation of the space. The scanner may be used to calibrate nodes on the EISU grid for reduced reflection of signals, signal noise and signal crossover issues. In some embodiments, geomagnetic sensors and electromagnetic frequency sensors may be added to allow for greater accuracy.

In some embodiments, additional approaches including enhanced measurements may be provided. For example, EISU grid data may be combined with geomagnetic measurement and electromagnetic measurement to provide an enhanced mapping algorithm to allow for higher accuracy within any given space. For example, by using the earth's magnetic irregularities, electromagnetic frequency sensing along with EISU nodes data on the EISU grid may create a clear picture of spatial addresses of IoT devices within indoor spaces. The combinations of these techniques built into the indoor scanner can create more informative information as to how IoT devices interact and behave within a network. Because IoT radio frequencies may be consistent from device to device this method may prove effective for detecting IoT nodes to connect to along with which receiver to listen with when operating with a multi-radio or multi-protocol receivers.

In some embodiments, additional use cases according to some embodiments of the present invention are: tracking IoT devices from origin position to a destination position indoors; mapping 3-dimensional structures for spaces; balancing Temperature across a space; automating multiple IoT devices as a group; creating EMF heat maps; XYZ axis data for compartments and shelves; stocking merchandise and automated retail; robotics mapping; first detection pairing with gateway; tighter and more accurate security nets; and detailed emergency reporting.

Figure 6:
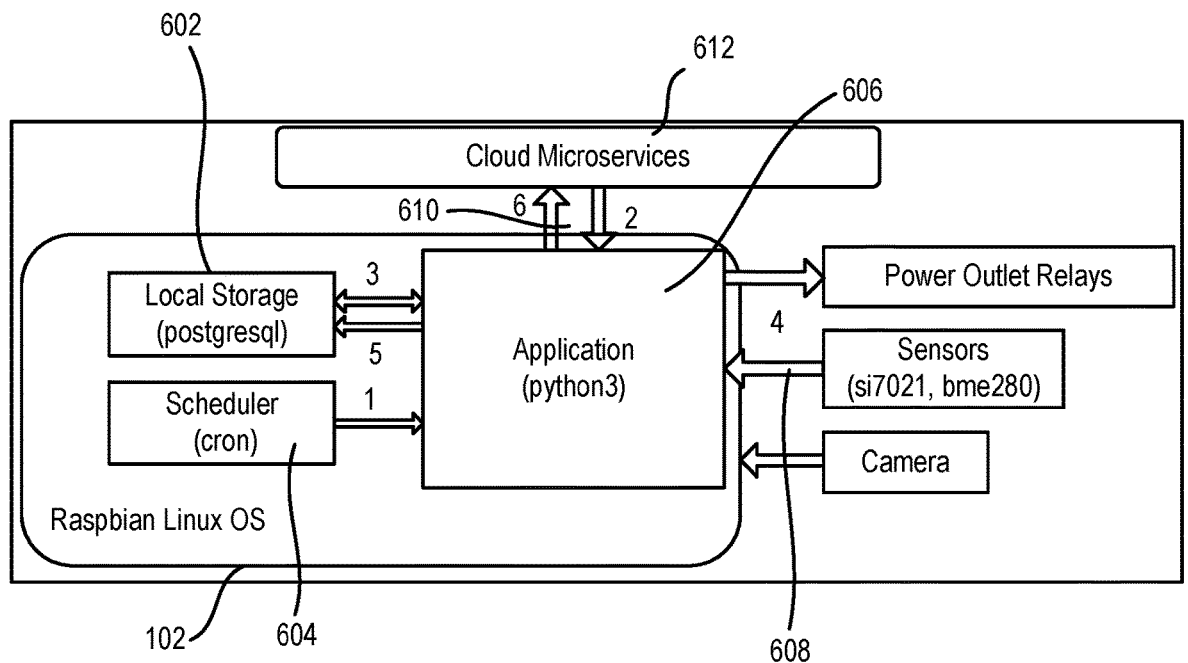
FIG. 6 is a block diagram illustrating an embodiment of an electronic device for controlling connected peripheral devices according to some embodiments of the present invention.

FIG. 6 shows a block diagram illustrating an embodiment of an electronic device 102 according to some embodiments of the present invention. In some embodiments, electronic device 102 may include one or more (e.g., all) of the following: local storage or memory 602, scheduler 604, one or more processors 606, e.g., running one or more applications, and one or more interfaces (e.g., wireless interfaces) 608 for two-way communication with one or more IoT peripheral devices 104 and/or sensors. Electronic device 102 may also include one or more interfaces for two-way communication 610 with one or more cloud servers 612. In some embodiments, scheduler 602 may periodically execute, e.g., python application script. In some embodiments of the present invention, if a network is available electronic device 102 may retrieve the latest grow configuration or other information, and/or provide status information, to the one or more cloud servers 612. In some embodiments, the one or more processors 606 running one or more applications may communicate and interface with local storage or memory 602 to, for example, update and/or retrieve a grow configuration or data concerning the same. In some embodiments, the one or more processors 606 running one or more applications may communicate and interface with hardware (e.g., IoT peripheral devices 104/and/or sensors) to obtain, for example, measurements and/or images. Based at least in part on such data, the one or more processors 606 may decide to issue (e.g., wirelessly) one or more control signals to and/or toggle outlet power relates corresponding to the hardware such as IoT peripheral devices 104 and/or sensors. In some embodiments, if a network is available (e.g., WiFi), the one or more processors 606 may send latest data, images and/or diagnostics to one or more cloud servers 612.

In some embodiments, scheduler 604 may be a CRON scheduler. In some embodiments, data may be exchanged (e.g., with one or more cloud servers 612) as JSON objects via API ('j son' and 'requests' Python interfaces). In some embodiments, memory 602 may include a PostgreSQL database and 'psycopg2' Python interface. In some embodiments, the one or more interfaces to hardware such as peripheral device(s) and/or sensors may include an I2C interface exposed via a MCP2221A Linux kernel driver. For example, it may interface via 'smbus2' Python interface. It may issue queries for sensor identities, and may obtains measurement if recognized. It may check the date, time and/or measurements against grow configuration cycles and measurement ranges, and the one or more processors 606 may decide to issue control signals (e.g., wirelessly) and/or toggle relays. In some embodiments, the interface(s) may include a Linux 'fswebcam' interface for obtaining camera images using 'subprocess' Python interface.

Various aspects of an electronic device 102 according to some embodiments of the present invention are described below.

1. Sensor Interfaces

Some embodiments of apparatuses described herein include an interface that integrates a data signal from a sensor, or in some embodiments, multiple data signals from multiple sensors. Each data signal may communicate information through, various wireless protocols mentioned or cloud-based protocols.

2. Power Relay

In some embodiments of the present invention, Grow Computer (e.g., when implemented as a smart power strip) includes a power relay circuit (e.g., integrated circuit chip) that enables tracking of the amount of electrical current or power (e.g., watts or kilowatts). The power relay circuit may track current or power usage of each one of one or more circuits on an individual circuit basis and report the energy usage back to a central processor of Grow Computer.

3. Grow Computer Digital Platform

In some embodiments, Grow Computer may include a flexible, device-agnostic software platform that can easily integrate and communicate with any chip (sensor, power, or processor) that is connected to it to handle data, process requests, turn on circuits and manage physical products from a cloud-based architecture.

In some embodiments, Grow Computer implements a novel architecture and method to handle and store the data that is required to allow for the full power and utilization of the platform. Grow Computer may provide a built-in data capture model that allows for the seamless integration of live and historical grow data as captured by the sensors attached to the platform. Grow Computer may include in some embodiments a lightweight operating system that will handle the data capture and outlet programming and open up the functionality through a software development kit (SDK) for developers around the world.

In some embodiments, Grow Computer may develop an SDK or a public API to give individuals control over their devices and allow anyone to build their own software to use Grow Computer. This directly opens up the possibilities of the device as it allows the world to decide how to use the hardware. In some embodiments, these applications can either supplement or supersede the Grow Computer web app.

In some embodiments, a separate cloud service is provided that utilizes past data to conduct machine learning for optimizing grows.

Device Implementation

In some embodiments, Grow Computer includes an integrated hardware/software operating system that controls the routing of all key data and turning on/off coupled devices by, for example, turning on/off corresponding connected components. In some embodiments, the software also causes storage of a local copy of the data for each grow as well as the recipe (e.g., software instructions for execution by one or more processors) for the relevant grow program.

Cloud Server

Figure 7:
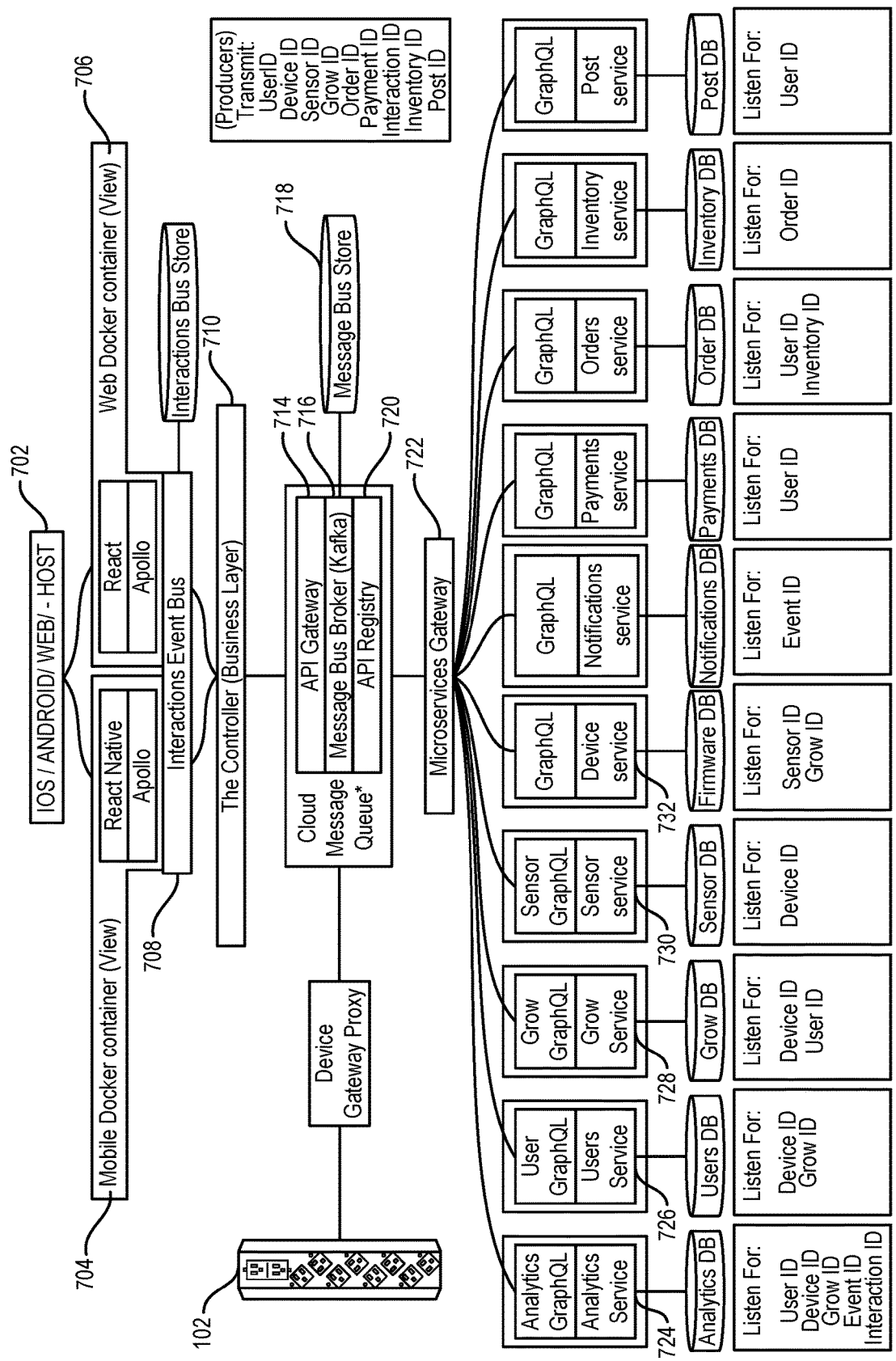
FIG. 7 illustrates an embodiment of a cloud server architecture according to some embodiments of the present invention.

FIG. 7 shows an embodiment of the cloud server architecture according to some embodiments of the present invention. In some embodiments, the device (Grow Computer) 102 communicates with a cloud-based server that acts as a smart conduit between the device OS and a front end user application. For example, long term data can be stored on the cloud, as well as all of the programs (e.g., recipes). Alternatively or additionally, in some embodiments, some or all of long-term data, programs, and/or recipes are stored in memory of Grow Computer and/or on the cloud platform. In some embodiments, from the server, APIs may be opened up for the development of recipes, programs, and/or compatible software applications for Grow Computer.

In some embodiments, the cloud server architecture may include: IOS/ANDROID/WEB—Host 702. It may include Mobile Docker container 704 (React Native, Apollo) and Web Docker container 706 (React, Apollo) of Interactions Event Bus 708. It may include Controller (Business Layer) 710. Cloud Message Queue 712 may be provided that includes API Gateway 714, Message Bus Broker 716 coupled to Message Bus Store 718, API Registry 720. It may also include, for example, Microservices Gateway 722 for Analytics Services 724, Users Services 726, Grow Services 728, Sensor Services 730, and Device Services 732.

Connecting to Grow Computer

Input Data From Users

In some embodiments, Grow Computer includes wireless capabilities to communicate with the various wireless communication protocols that allows a user to pair to Grow Computer from any suitable computer device (mobile phone, tablet, laptop, desktop, or web-enabled device) by searching a local network (e.g., LAN) for identifiers (e.g., IP addresses) of unconnected Grow Computers. Alternatively or additionally, in some embodiments, Grow Computer communicates with a cloud server such that the user can be connected to Grow Computer on a local network (e.g., LAN) and/or WAN via the cloud. Alternatively or additionally, in some embodiments, Grow Computer includes one or more suitable communication interfaces (Bluetooth, light-pipe, radio wave, ZigBee, RFID, or scanned code) to allow a user to pair with Grow Computer via those interfaces.

In some embodiments, once the device has been paired the user can assign or associate Grow Computer(s) to a profile for the user. For example, the user selects a Grow Computer by serial number via the user interface and assigns that Grow Computer to their user profile. In some embodiments, the registered Grow Computer IP and Serial number is sent to the cloud. The assignment data is stored locally on the computer device and sent via API to the Grow Computer Cloud Message Queue and is published to be consumed by subscribed micro-services.

Interacting With and Functionality of the Grow Computer

A Growth Cycle

In some embodiments, users initiate a plant growth cycle on any suitable mobile phone, tablet, laptop, desktop, or web-enabled device in communication with Grow Computer. For example, in some embodiments, users can enter form details about the type of growth cycle they are initiating. The user's data about that grow is stored in the local device log and database of Grow Computer, and sent via an application programming interface (API) to the cloud message queue for synchronization. After synchronization, the data is published to be consumed by subscribed microservices for user data and grow cycle data. After the growth cycle has been initialized and synchronized, the user can proceed to program a schedule for their growing environment.

Scheduled Program

In some embodiments, users can program time and dates for devices coupled to Grow Computer to turn on or off, and/or to perform other action(s) in connection with embodiments wherein Grow Computer can control power to the coupled devices and/or provide control signals to those devices. This program is set through a form on the user interface which gets stored locally on the computer device and then synchronized with the cloud. When data on the cloud has been synchronized, it publishes new data to be consumed by the Grow computer microservice and is sent via API to the user's Grow Computer device.

The Grow Computer Device Data Stream

Receiving Cloud Data

In some embodiments, the device receives the latest data stream from the synced message queue via API on the cloud and stores that data locally. It synchronizes its configuration to that of the cloud. Initialized growth data and scheduled programs are stored locally on the Grow Computer database to be run as a new program. In some embodiments, power and/or other outputs on the Grow Computer device are turned on or off and/or otherwise modified based on the scheduled program of that specific user. For example, as the outputs are turned on and off the Grow Computer Device sends a status of "turned on successfully" or "turned off successfully" to the cloud message queue as newly published data. That data is consumed by one or more (e.g., all) connected computer devices to display status to users.

Sensor Data

The sensor data stream is collected through the enabled (e.g., wireless) devices. The data stream is stored locally on Grow Computer, passes through a secure gateway and is sent via API to the Cloud Message Queue as newly published data. The Cloud publishes the sensor data for one or more (e.g., all) subscribed microservices and computer devices. The computer receives the device's sensor data via an API call and displays the relevant data to the user.

The Grow Computer Cloud Core

Cloud Message Queue

In some embodiments, the Cloud Message Queue (CMQ) is responsible mainly for the synchronization of the data and its connected parties. For example, the Grow Computer CMQ allows all incoming and outgoing API data to be exposed to "subscribers." Relevant published data will be routed only to the subscribers of that data as defined by the controller. The queue is also a historical record that is maintained by timestamp (e.g., UTC timestamp). Offset data is automatically adjusted in the correct order. If the CMQ is offline the status is sent to both the Grow Computer device and to the registered computer devices for user feedback.

Microservices

In some embodiments, microservices cover one or more (e.g., all) functions of the Grow Computer Core Cloud. Microservices relate to individual database tables for each component, as opposed to a traditional data model that has all data in one database. In some embodiments, each function is kept separate in a silo to allow for simple maintenance and flexibility to limit system downtime. In some embodiments, microservices send and receive data via API based on the needs of the microservice itself. Each microservice relies on data for consumption but is substantially or fully unaware of any other microsevice(s) that are outside of its data demand. Each microservice has its own store and is a historical record of all events on that microservice. When the relevant data is published, the microservice consumes the data for use when called upon by the Graph Query Engine.

The Controller

In some embodiments, the Controller (e.g., a server and/or including one or more processors) in the cloud processes all event data via API from registered devices and Grow Computer. These events are passed through functions that encrypt, authenticate, authorize, read, write, and update data. When the data has been processed, it is passed to the CMQ for delivery to its proper store. The controller also maintains the rules for how the system flows, and it manages the rights of the access of system data. It is also the conductor of the API itself and the rules that manage it. Because the controller is designed to be abstracted, it allows Grow Computer to reconfigure the controller to suit the needs of external parties for white label and for custom configurations.

Grow Computer API

In some embodiments, the Grow Computer API is responsible for what data is passed internally. This API is closed to the public and is the pipeline between all functions in the system. It is designed to work with rules set by the controller and communicate with both the Grow Computer device as well as the front-end user experience.

Graph Query Engine

In some embodiments, the Graph Query Engine (GQE) is written in a graph query language. For example, its main job can be to search across all silos to find the relationships between them. A neural network can expose those relationships to the cloud environment. That data is made available to the controller and in the user interface (UI) of the registered devices. The GQE data is used for analytics data, recommendations, machine learning algorithms, social connections between users, geolocation data, user-generated search events, and sharing of data specific to the environment called recipes. The graph engine is also equipped to handle and store all calls made to the CMQ for any purpose required for user interaction and future requirements for updates.

Docker

In some embodiments, one or more (e.g., all) of the microservices, CMQ, GQE, and registered devices run in a virtual environment to ensure users get the expected benefits of performance, flexibility, and integrity of data. For example, Docker software or other software runs local on all devices and can be replicated for purposes of scale. This software allows for a reduction in dependency on several hardware server stacks to complete its functionality year over year. This software routes data calls internally on the one hardware server blade until the space is filled. When there is no space available, Grow Computer data consumes an additional blade to complete its functions.

Data Recipes

In some embodiments, Grow Computer runs one or more programs or data recipes that controls functions of Grow Computer and coupled devices. For example, this concept can be applied to Indoor Agriculture as the concept of a "plant recipe" that dictates a user written or computer derived set of environmental circumstances that will, for example, achieve one or more (e.g., all) of the following: grow a plant to maximize phenotypic (qualitative aspects of the plant) traits such as taste, color or yield, and/or minimize grow time and/or or energy used.

In some embodiments, the concept of a recipe relates to the time and plant-specific plan for growing. The recipe includes the composite programs from day 1 through the end of the grow. These include light cycle (and the changes over time), water cycles, nutrient cycles, desired air temperature, humidity, and $CO_2$ and/or other environmental factors. The idea is that these can be packaged up and shared as specific file type and then be directly implemented through Grow Computer on a grow across the room (e.g., connected via LAN) or the world (e.g., connected via the cloud). In some embodiments, an online marketplace or community for recipes is provided to share, store, compare and sell recipes to other growers on the platform.

In some embodiments, the Grow Computer platform (including both Grow Computer(s) and the cloud) collects and shares recipes for growers by wrapping up and sharing end-to-end grow details in the users' central repository. Alternatively or additionally, the Grow Computer platform shares and/or replicates these environmental variables in consecutive grows or even grows shared between individuals or farmers.

Open SDKs & User-Generated Apps

In some embodiments, the Grow Computer platform includes a full-suite of public APIs and SDKs that can be accessed by developers and users around the world. Thus, the functionality of the hardware with the software infrastructure noted above provides a baseline set of available functions, options, and uses for Grow Computer, and the platform then allow users, at their option, to develop their own front-facing applications and data management tools that best fit their use cases. For example, the Grow Computer platform (e.g., Grow Computer and/or cloud) may interface through the OpenAPIs with potential applications including:

Community Sharing—a centralized community application where users can share growing results, programmed functions (i.e., light cycles), or recipes in a central space Grow Monitoring—application(s) for "monitoring" businesses or software that can use either live people or computer vision to monitor the health of plants within user grows. A "remote monitoring" application can have the ability to suggest new grow cycles, light recipes or other improvements for the health of the grow directly to the hardware, with or without the interface of the grow owner.

Grow Management—end-to-end software to manage an indoor grow to optimize grow results or other features.

STE(A)M education—compatible software or application that would enable students and teachers to get additional data from hydroponic systems currently used in classrooms. Right now, there is a global movement to teach more science and computer engineering to K-12 students, and hydroponic systems have been recently adopted globally. For all of these systems, there is no digital interface, thus providing a monitoring problem (during holidays and such) and also a missed opportunity for teaching coding through this metaphor. Grow Computer can easily be integrated into all of these systems to add in the computer science angle to these hydroponic grows. From there, we can create a global network of students and educators that connect around grow recipes and citizen science.

"Prosumer-level Indoor Agriculture Product"

In some embodiments, the Grow Computer serves as an end-to-end IoT control system (e.g., IoT controlled power circuit) that can be applied in multiple contexts. In one embodiment, the Grow Computer is utilized and configured for indoor agriculture, and in other embodiments, is configured to grow any biological product. This embodiment serves unique needs for growing indoors, and the lack of available solutions in the market, including but not limited to for the reasons described below:

Computer—The computer (e.g., including one or more processors) will be responsible for communicating with the sensors, handling the information from the sensors, providing control to the power relays, energy tracking and transmitting all applicable data to the cloud server and also interpreting any commands and relays from the cloud and acting upon them.

Includes microcomputer, microcontroller, system on a chip, module, or any other computing platform.

This computer including one or more processors may access and execute one or more programs comprising computer program instructions for implementing one or more recipes as described herein. In some embodiments, the program instructions (e.g., software) may be stored in suitable memory of Grow Computer.

Universal Sensor and Control Interface—The device includes multiple wireless antennas and sensors within the computer to connect to any 3rd party hardware protocols within range to allow for a network of input peripherals and sensors (discussed below).

In some embodiments, Grow Computer can be configured with various suite(s) of wireless protocol sensors that can connect to different components from various manufacturers across various protocols. In some embodiments, components described herein (e.g., electronic device 102 and/or peripheral devices and/or sensors 104) may include or be integrated with a unique set of one or more sensors from another hardware company.

In some embodiments, communication architectures which lack a standardized connector interface (I2C, SPI, etc.) are rendered suitable for use by providing a custom connector solution incorporated to facilitate the rapid, easy, and reliable connection of sensors and/or external control devices.

In various embodiments, Grow Computer could not only be used for sensors, but alternatively or additionally for the control and/or powering of output devices (e.g., control and operate small peristaltic dosing pumps for delivering nutrients), robotic arms, drones, pumps and other components.

Network Interface—Grow Computer may connect to a network to send and receive data through any available connection standard, such as Wired, Wireless, Ethernet, Wifi, Bluetooth, ZigBee, and/or IR.

Power Inlet—Grow computer can connect via wired connection to various power circuits through the use of a standard AC plug or power inlet module and mating power cable. It also incorporates a fuse.

Grow Computer Features

Grow Computer in some embodiments may control a grow, collect data, and can allow the building of smarter farms. Grow Computer or GrowStrip in some embodiments may include one or more (e.g., all) of the following features:

Digital Layer—Using Grow Computer in a grow brings a new digital layer to the grow. By unlocking key grow data to the open-source software world, exponential development of the space is enabled through integration of artificial intelligence, machine learning, and computer vision algorithms as well as fostering an entire global digital community of growers.

Persistent Presence in a Grow—Grow Computer platform provides growers the ability to see the ecology as well as live photos of their grow from their smartphone, tablet, or computer. This presence, when combined with Grow Computer's lines of hardware and sensors give growers an idea of what is going on in their grows, and access to any alerts or alarms from anywhere in the world, give growers a piece of mind and the ability to fix any problems that could linger between hours at the farm.

Multiple Actuator Programming—Through the Grow Computer platform software and APIs, growers and users can create unique programs (e.g., recipes) by remotely switching any or all of the coupled controllable outlets, circuits or actuators on or off in sequence, or based on a program.

Outlet-Specific Energy Tracking—The Grow Computer platform allows outlet-by-outlet tracking of energy consumption. The Grow Computer platform can thus, for example, identify the electrical consumption by device. When combined with smart software, and individually controlled outlets, grows can be compared on the per-kilowatt basis. Grow Computer individually measures and collects information regarding the AC current going to each outlet.

Connectorization and Plug and Play Interface of Sensors—Grow Computer continuously scans its sensor interface ports looking for the connection of a sensor. Once it senses that a sensor has been connected it queries the sensor for internal information, for example, a unique ID number and/or data stored on the sensor, which is then checked against a database or algorithm to ensure the sensor is genuine or otherwise approved for use with Grow Computer. Grow Computer then proceeds to allow the system to utilize the sensor. Sensor specific information such as capability, ranges, calibration values and/or customer related information may also be tied to the internal sensor identification information through a database, algorithm or data stored in the sensor. To provide additional security, latching connectors are incorporated into the sensors so that they must be interacted with to remove them (i.e., cannot be pulled out by accident).

Front End User Interface (App and Web)

In some embodiments, the front end application will be the user-facing space for the grower to see, share and analyze relevant grow information, store programs and data, remote monitor, and also program grow recipes. No data will be stored on the application as all relevant data is pulled from the back-end server.

In some embodiments, a Grow Computer-branded application provides the user key grow functions at the tip of their fingertips. From our core app (e.g., built on reactJava to allow easy cross-device functionality from one code-base), one or more (e.g., all) of the following functions can be built in.

For example, the app may include the ability to turn on/off each of the outlets (e.g., 8 outlets) and set a grow "program". For example, the outlets may have one or more (e.g., all) of the following 3 initial programs available: on/off at set times each day (e.g., on at 8 AM and off at 8 PM); on/off for durations (e.g., on for 5 minutes and off for 60); programmed to manage a certain variable in the system (e.g., manage HVAC to maintain a temperature of X).

In some embodiments, the app may allow a user to see recent photos of grow.

In some embodiments, the app may allow a user to see data overlaid of recent environmental variables In some embodiments, the app may allow a user to get alerts and alarms.

FIGS. 8-18 are screen shots of illustrative application interfaces presented to a user of an electronic device 102 according to some embodiments of the present invention. In some embodiments, these interface screens may be displayed via a user's web browser (e.g., on a desktop computer) and/or via an application or web browser running on a user's mobile device.

Figure 8:
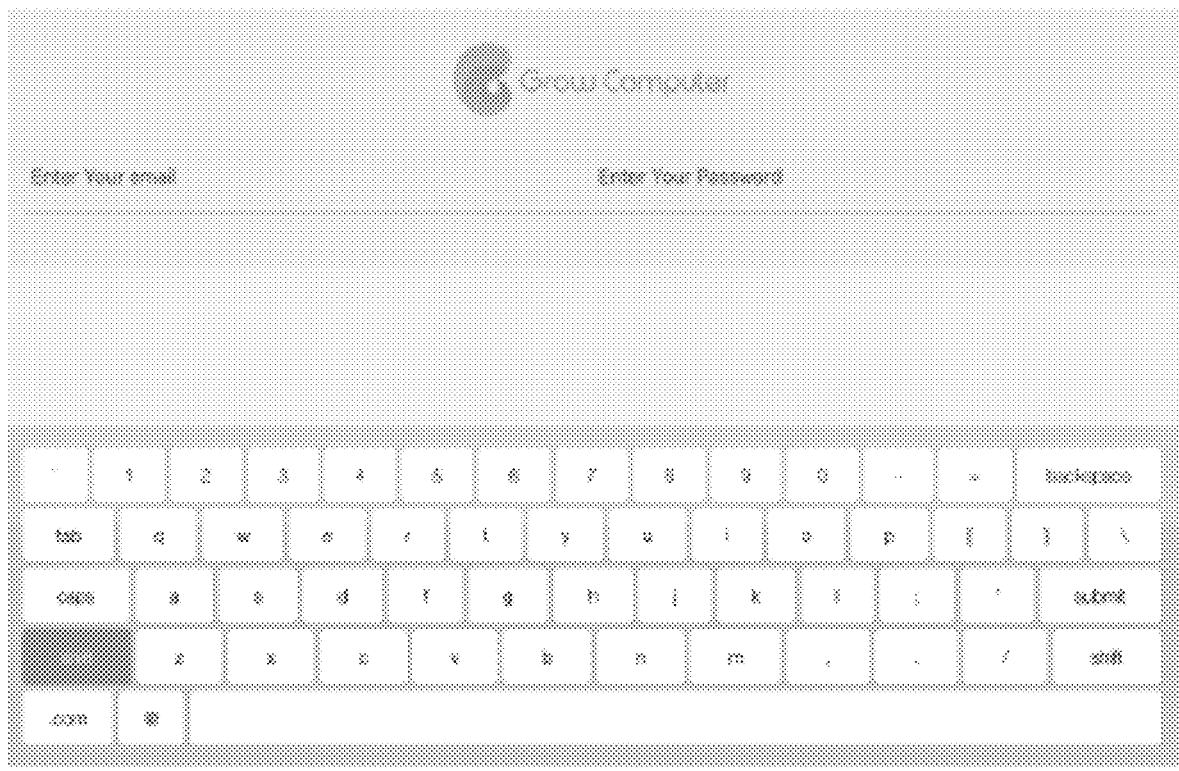
FIG. 8 is a screen shot of an illustrative display interface presented to a user of an electronic device according to some embodiments of the present invention, showing a display screen for allowing a user to authenticate via a cloud server.

FIG. 8 shows a display screen for allowing a user to authenticate via a cloud server (e.g., 106) and connect through the local GrowHub to connect that system to their user account.

Figure 9:
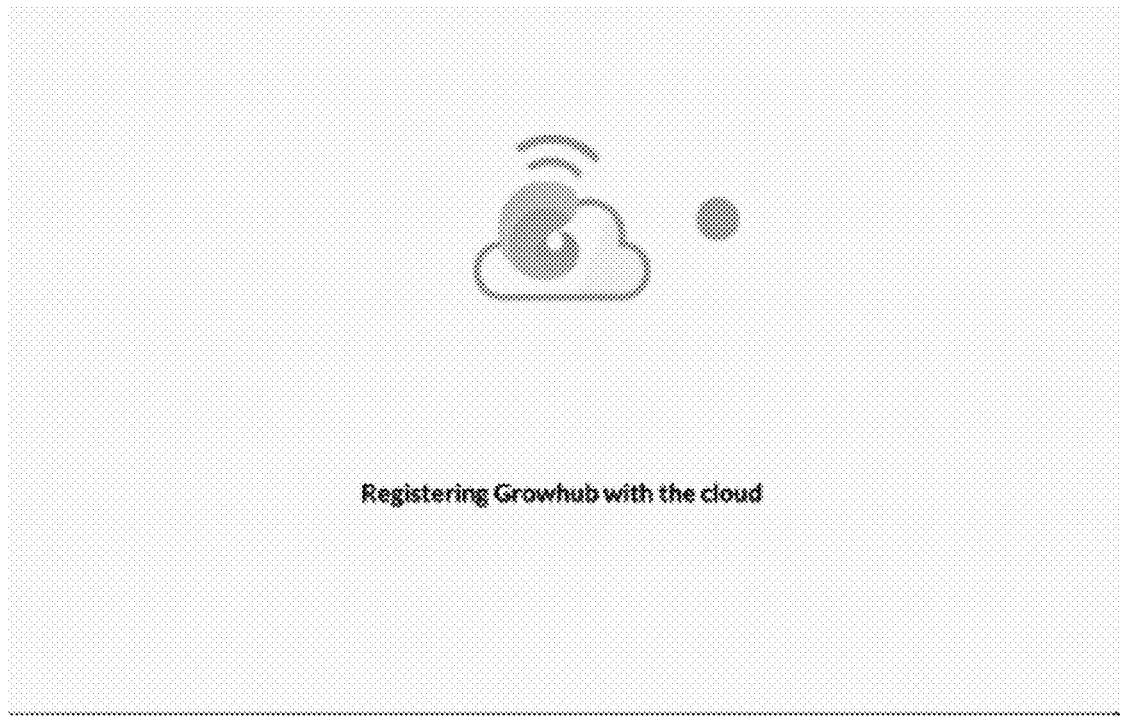
FIG. 9 is a screen shot of an illustrative display screen presented to a user when the user's electronic device is registered with the cloud.

FIG. 9 shows a display screen presented to a user when the user's electronic device 102 is loading and registered with the cloud (e.g., cloud server 106).

Figure 10:
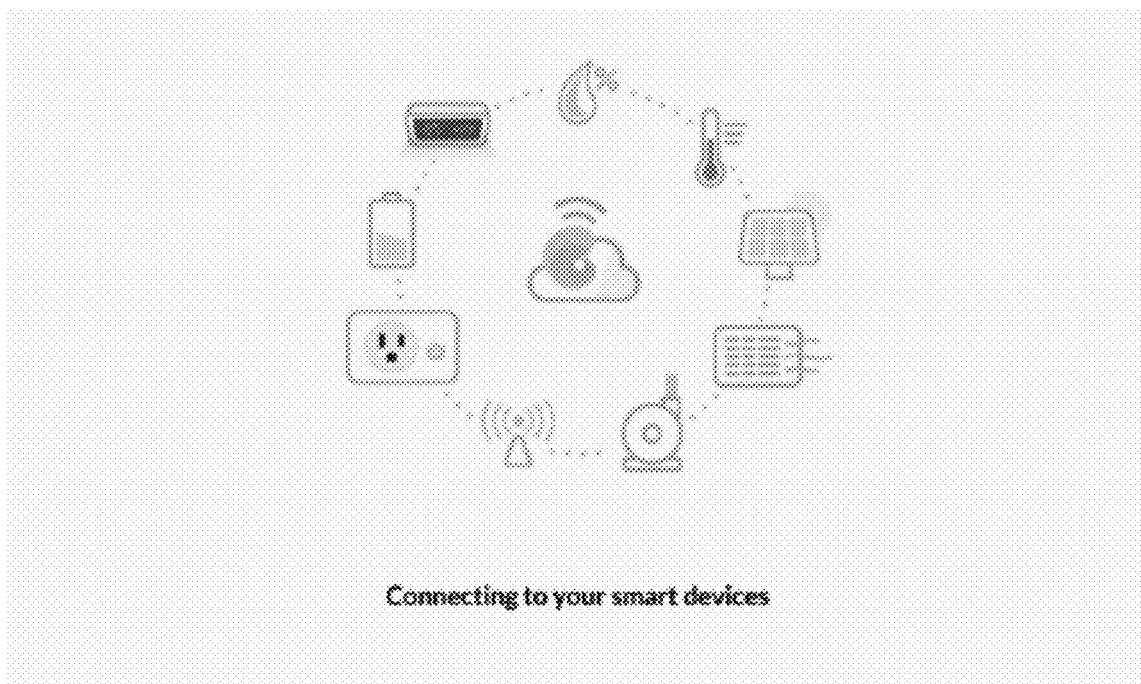
FIG. 10 is a screen shot of an illustrative display screen presented to a user when the cloud is refreshing or connecting to user's electronic device, which in turn connects to one or more connected peripheral devices such as sensors.

FIG. 10 shows a display screen presented to a user when the cloud is refreshing or connecting to user's electronic device 102, which in turn connects to one or more connected peripheral devices (e.g., 104) or sensors.

Figure 11:
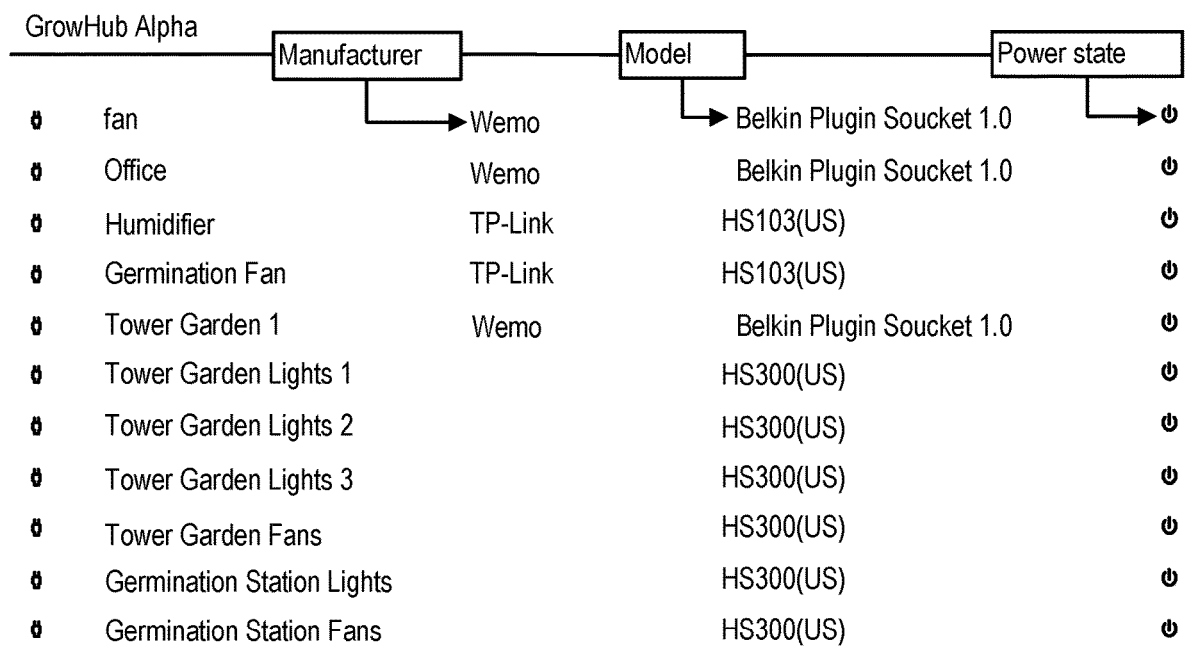
FIG. 11 is a screen shot of an illustrative display screen presenting the user with data indicative of the peripheral devices connected to the user's electronic device, including, for example, device name, device manufacturer, device model, and power state of the peripheral device (e.g., on or off).

FIG. 11 shows an illustrative display screen presenting the user with data indicative of the peripheral devices (e.g., 104) connected to electronic device 102, including device name, device manufacturer, device model, and power state of the peripheral device (e.g., on or off).

Figure 12:
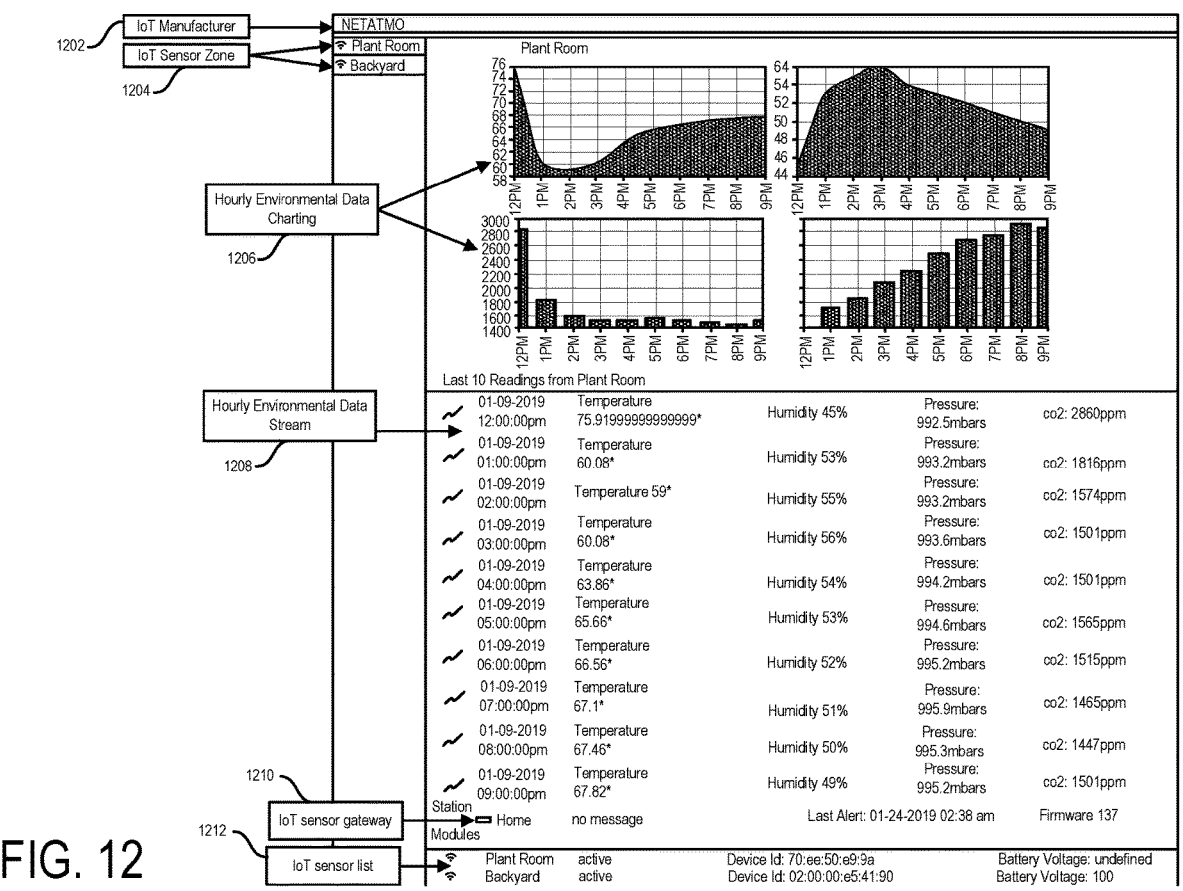
FIG. 12 is a screen shot of an illustrative display screen presented to a user including, for example, information regarding the IoT device manufacturer, IoT sensor zone, hourly environmental data charting, hourly environmental data stream, IoT sensor gateway information, and IoT sensor list information.

FIG. 12 shows an illustrative dashboard and display screen presented to a user for detailed descriptions of the devices, status and historical data of the sensors in the system. In some embodiments, this information can include information such as the IoT device manufacturer 1202, IoT sensor zone 1204, hourly environmental data charting 1206, hourly environmental data stream 1208, IoT sensor gateway information 1210, and IoT sensor list information 1212.

Figure 13:
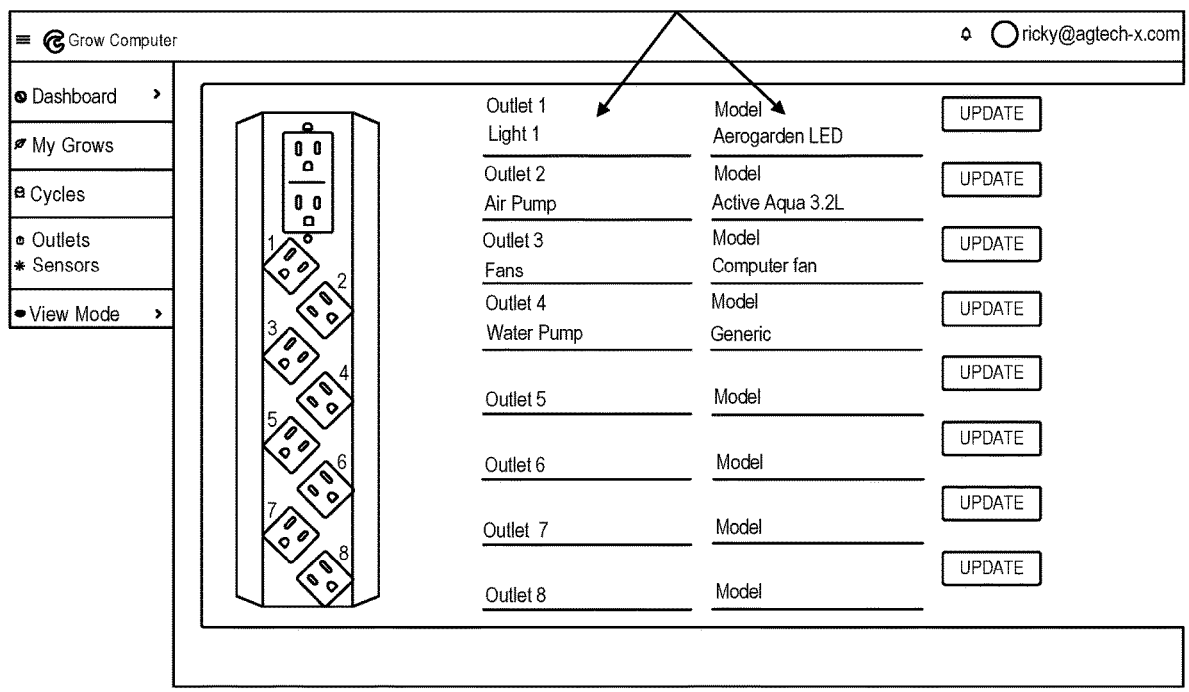
FIG. 13 is a screen shot of an illustrative display screen presented to a user showing the peripheral devices and/or sensors connected to and under the control of the user's electronic device.

FIG. 13 shows an illustrative display screen presented to a user showing the peripheral devices and/or sensors connected to and under the control of electronic device 102. From this screen the user can name and create shortcuts for all of the circuits, pumps, fans, lights and actuators that live in the grow.

Figure 14:
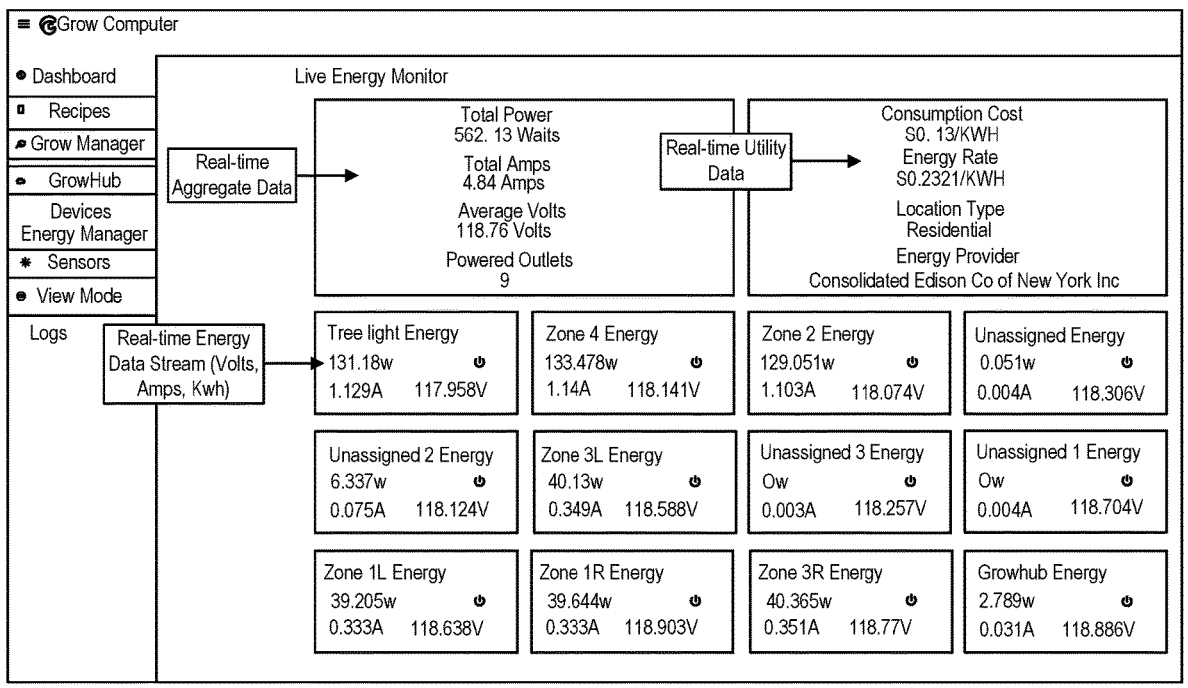
FIG. 14 is a screen shot of an illustrative display screen presented to a user showing live data (e.g., live energy usage data), including real-time aggregate data, real-time utility data, and/or a real-time energy data stream (e.g., volts, amps, kwh).

FIG. 14 shows an illustrative display screen presented to a user showing live data (e.g., live energy usage data), including real-time aggregate data, real-time utility data, and/or a real-time energy data stream (e.g., volts, amps, kwh). The data is overlaid with the local energy utility live power rate. This information is connected through the energy utility API for the individual energy provider and can indicate the costs of and/or how much energy has been used by the system and/or individual components from seed to harvest.

Figure 15:
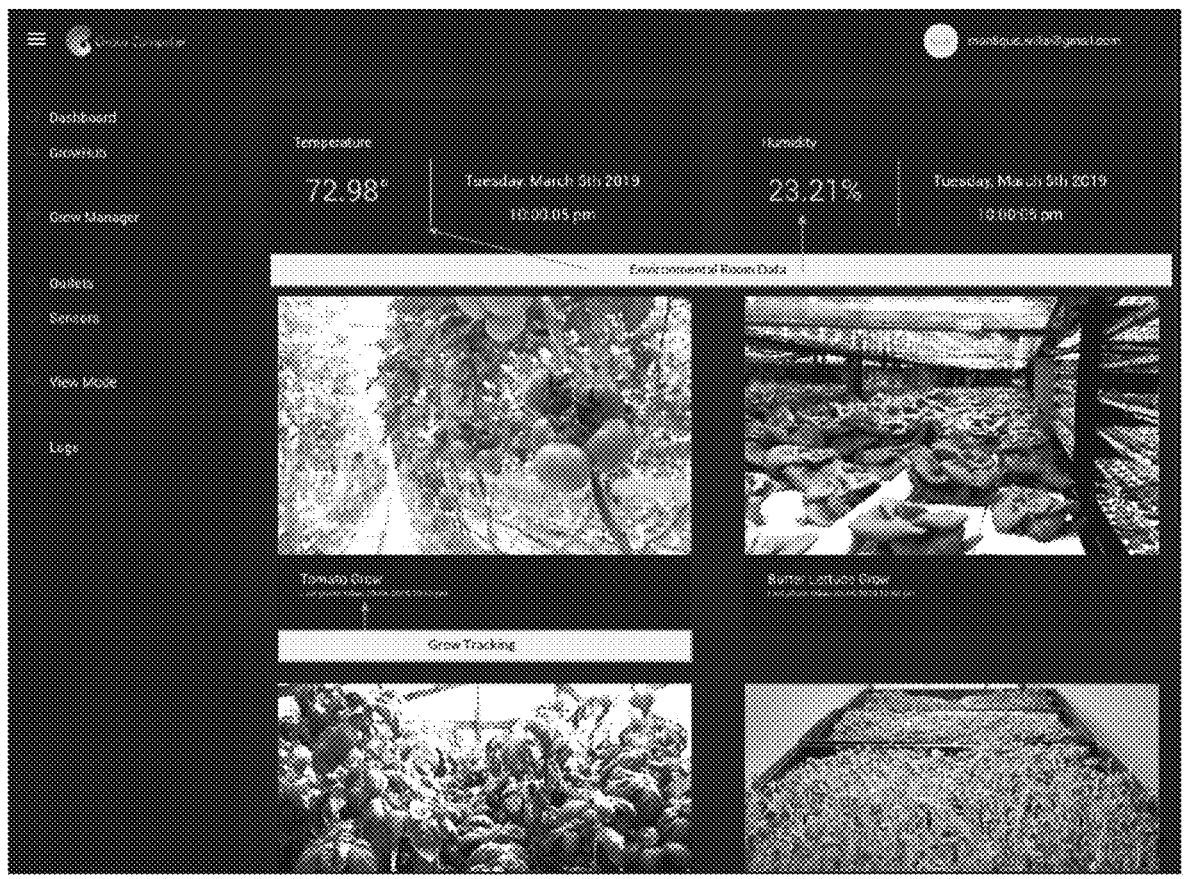
FIG. 15 is a screen shot of an illustrative display screen providing environmental room data (e.g., humidity) for a grow and/or grow tracking information.

FIG. 15 shows an illustrative dashboard display screen providing key environmental room data (e.g., humidity) for a grow and/or grow tracking information. This screen may be customizable by the user to show key components on the front dashboard.

Figure 16:
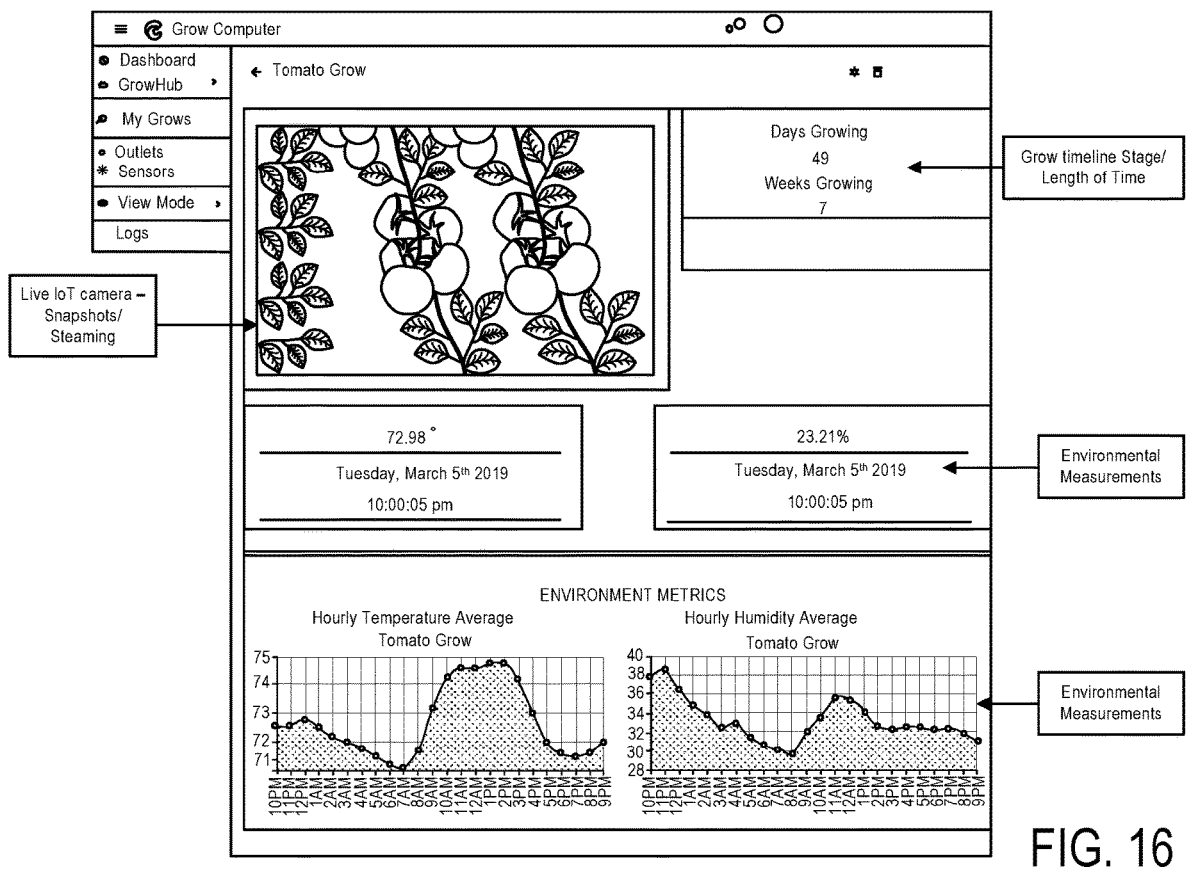
FIG. 16 is a screen shot of an illustrative display screen providing live IoT camera snapshots and/or streaming, grow timeline stage and/or length of time, and environmental measurements.

FIG. 16 shows an illustrative display screen dashboard for a specific grow, with the relevant data, settings, environmental data points and photos. For example, it may provide live IoT camera snapshots and/or streaming, grow timeline stage and/or length of time, and environmental measurements.

Figure 17:
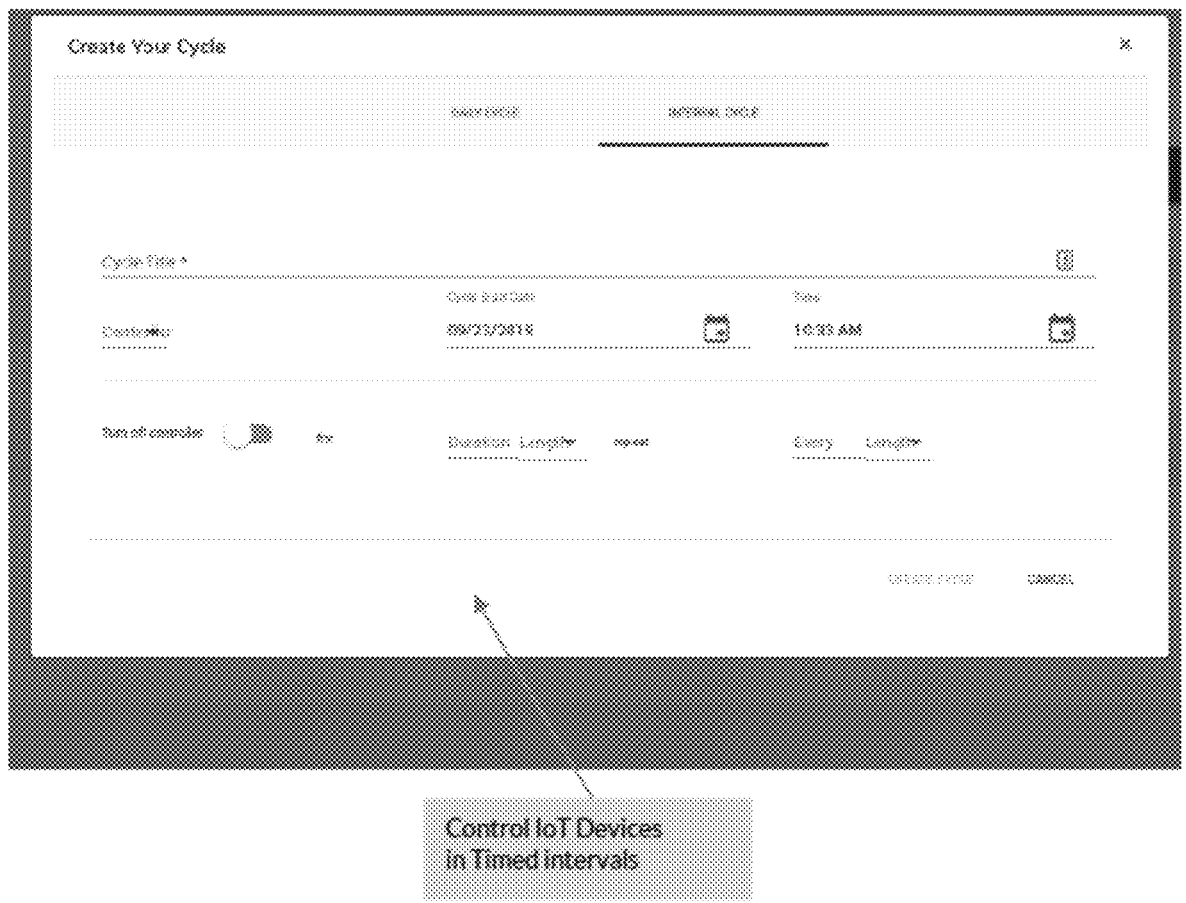
FIG. 17 is a screen shot of an illustrative display screen allowing control of connected IoT devices in timed intervals.

FIG. 17 shows a user-driven menu to create cycles for turning on grow room components. For example, the two options may be daily, based on turning components on/off on specific times each day, or interval-based cycles that are "on for x minutes, off for y minutes." This is an illustrative display screen allowing control of connected IoT devices in timed intervals and other embodiments are possible.

Figure 18:
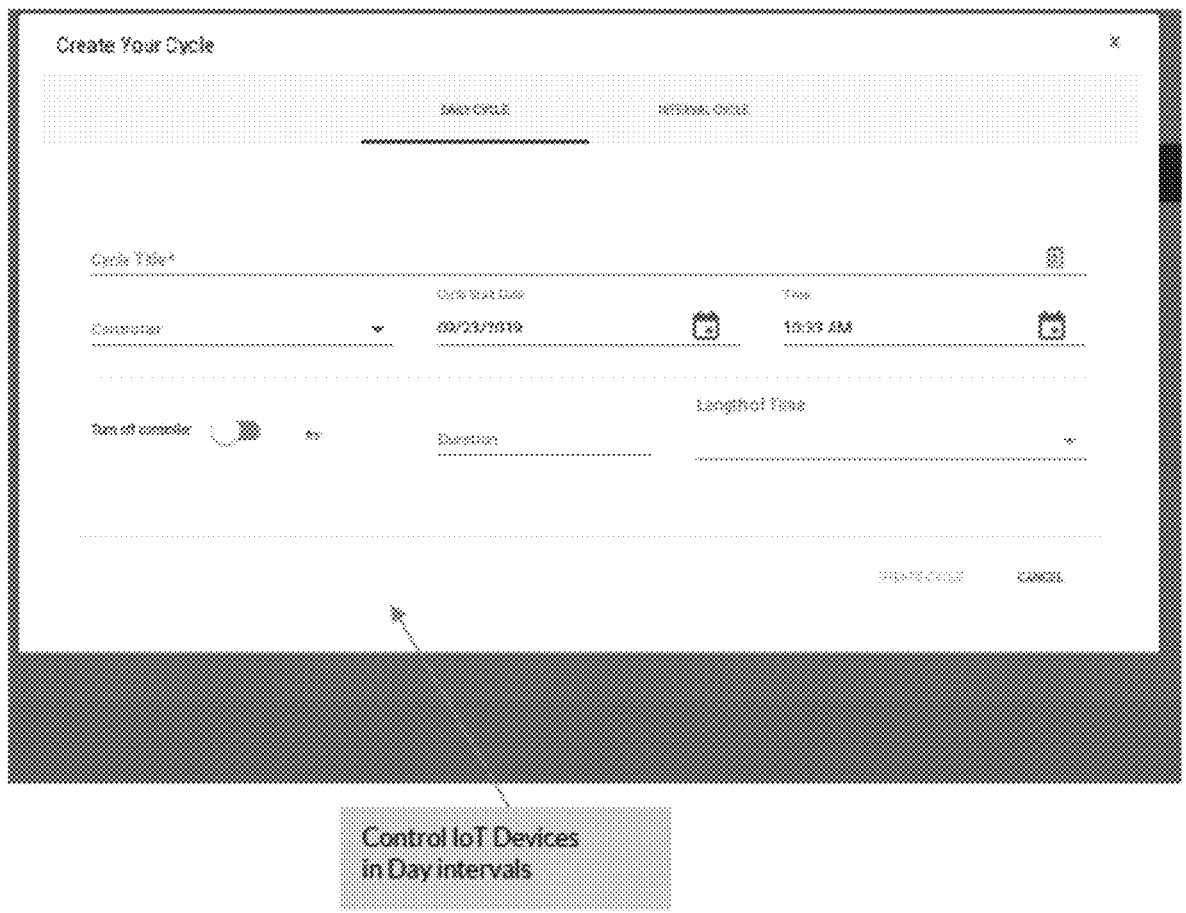
FIG. 18 is a screen shot of an illustrative display screen allowing control of connected IoT devices in day intervals.

FIG. 18 shows an illustrative display screen allowing control of connected IoT devices in day intervals.

Indoor Agriculture Overview

Indoor agriculture comes in many different forms, and each farm, grow, and indoor grow setup is unique in its specific configuration, however follows many basic types to solve common functions. Indoor grows all need the same system features to consistently grow high-quality plants, including one or more of the following:

Light Source—Lights are crucial for every grow, however there is a massive variety in the type (LED, fluorescent, ceramic, metal halide, etc.), strength, array, and wavelength. Even greenhouses often have extra lights. However, one constant for all of these lights is the need to be plugged in to an electrical source.

Temperature—Inside the grow environment, temperature is one of the most crucial variables. Many plants have wildly different success rates at different temperatures, and thus growers often have temperature control and HVAC systems to optimize the indoor temperature. For smaller grows, this is often with just a plug in heater and chiller. Once again, note that these systems are plugged in to the electrical source of the physical building.

Water System—Every grow needs a method of delivering water consistently to the roots of plants. Much of this is covered below (see: Hydroponics). However, these systems often have multiple water pumps, air pumps (for oxygenation of the water), as well as heaters and chillers. Again, note that these systems are plugged in to the electrical source of the physical building.

This is where hydroponics, aeroponics, aquaponics, and other -ponics growing concepts come in. They are all technical systems of delivering water to plant roots efficiently at scale.

Nutrient System—The last major component is in the nutrients that are delivered to the system. This is often through direct injection into the water tank, or other delivery mechanism. Also plugged in.

Grow Computer is adding in digitization and smart farming services where each unit and device is plugged in. Electrical use is going to be a constant input to indoor farming for a long time. By leveraging the equipment and infrastructure currently in place, the Grow Computer platform will become the new standard controller for indoor farming.

Hardware Layout—Wireless Sensors

In some embodiments, the layout for a system with wireless sensors is the same or substantially the same as that which would be seen if the electronic device 102 were to be wired to the peripheral devices and/or sensors 104, except in the wireless embodiment control is provided wirelessly and the peripheral devices and/or sensors 104 do not get their power from electronic device 102. The wireless communication may be over one or more (e.g., all) WiFi, Bluetooth, Zwave, ZigBee, Optical, Infrared, Sound, Ultrasound, or any other communications protocol or method suitable for use with sensors and/or other peripheral devices. In some embodiments, the electronic device 102 may have an interface for each of these wireless protocols.

Figure 19:
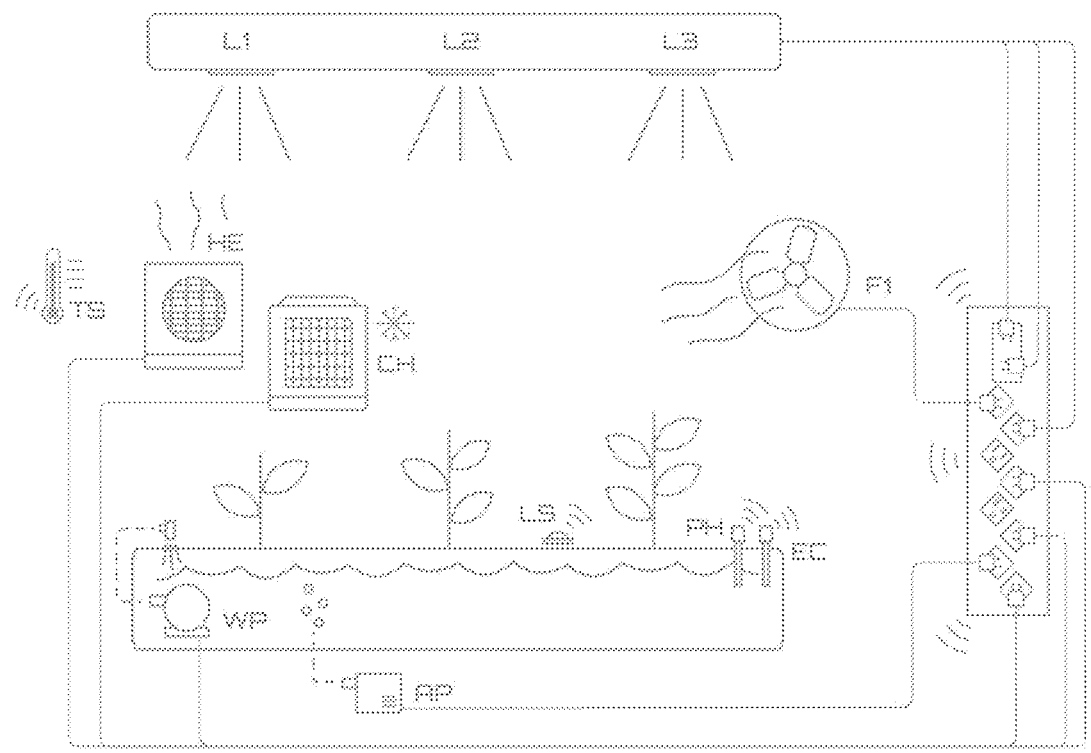
FIG. 19 is a diagram of a system employing an electronic device according to some embodiments of the present invention.

FIG. 19 depicts a system employing an electronic device 102 according to some embodiments of the present invention. In the embodiment shown, the lines can represent either physical wires (in a wired embodiment) or wireless communication channels (in an embodiment where electronic device 102 communicates with peripheral devices and/or sensors 104 wirelessly).

This figure is a basic representation of what an indoor grow might look like integrated to Grow Computer in some embodiments of the present invention with all sensors being wired according to one embodiment of the present invention, as further described below.

Peripherals that are Plugged into Outlets:

L1-L3—Separate lights plugged into separate outlets (e.g., power outlets resident on electronic device 102). This allows the grower to create new spectrum combinations, or flexibly control when the lights turn on. For example, the recipe or program run by Grow Computer can cause Grow Computer to implement a light cycle that gets longer by 8 minutes every day to better match the natural path of the sun.

WP—Water pump circulates water from the water pump to the delivery mechanism to the roots. One grow can have multiple water pumps or one water pump can power multiple systems.

AP—Air pump that oxygenates the water supply for better plant growth.

HE/CH—Heater/chiller to modulate the temperature of the grow.

F1—One of many possible fans for air circulation around the plants.

This diagram also shows sensors plugged into the Grow Computer:

TC—Temperature sensor that is able to live track temperature, humidity, and CO2 data.

VC—High-definition (with IR or other imaging filters) video camera that is able to take photos (or videos) every X minutes or other period of time (e.g., determined by the product) of the grow. This is used for long term tracking and can be used for machine learning and computer vision projects going forward. Note that each grow may have multiple video cameras. In some embodiments, the photographs or videos are provided to the Grow Computer cloud, and/or provided to Grow Computer by a suitable data connection (e.g., a data connection that is separate from the power connection, or a powerline data connection that uses the same wire for communication that is used to provide power to the peripheral).

LS—Light sensor, such as, for example, an available light sensor that will be able to tell some combination of PPFD, PAR, and light spectrum analysis.

PH/EC—pH and Electrical Conductivity (EC) sensors that are able to measure water and nutrient variables.

The grow setup described above is relevant, for example, to any small to mid-size grower and is presented in various ways based on the goal and the individual or group growing. When looking at the types of use cases for Grow Computer, the following may be the primary types of users:

Home Growers—People who have home or local grows where they grow either leafy greens, vegetables, and/or fruits for medicinal use or for personal use.

Growing Farmers—Entrepreneurs expanding their operations to small and medium-sized farms.

Researchers—Using Grow Computer to help researchers test certain changes to environmental or growing variables because of the consistency of the hardware. When utilized in similar setups with the same capture and control technology of Grow Computer, new and exciting scientific research is enabled.

Students—Grow Computer allowing students to connect and research with other classrooms either across the hall or around the world. The consistency of the technology and the software platforms (more below) enable new research and methods of teaching STEAM education.

Entrepreneurs—Grow Computer helping entrepreneurs provide better services to grows. By using Grow Computer technology as the basis of their technology platform, an entirely new sector of service and monitoring businesses is created, with specific focus, for example, on medicinal plants.

Additional Embodiments

The Grow Computer platform is a universal platform for all IoT projects and has multiple functions. For example:

Additional sensors and peripherals can be provided supplement those identified above. For example, DNA sensors, advanced robotics, drones, and any other type of future technology can be integrated seamlessly into the Grow Computer platform. Any device that is entered into the platform can be error tested and productized for mass market. For example:

Plant-specific beacons to track the individual movement and characteristics of individual plants.

Robotic arms to move, clip, trim, or otherwise interact with plants or other features within the grow environment.

Wireless drones that can remote monitor or investigate small areas of the grow.

Wireless, self-powered agricultural sensors.

Using solar power to power a solar cell using ambient light generated from the artificial light within a CEA grow. For a wireless sensor, a small battery will be powered in order to power the sensor and wireless board. Rather than plug it in, or rely on changing the batteries, excess light energy from the grow is used to charge a small battery enough to power the wireless sensor.

Using Z-wave technology to power the wireless IoT sensors.

Meshing Grow Computer devices together to cover a larger, growing, or more commercial grow space. The wireless technology in the individual devices enables them to communicate with each other to provide larger coverage of an indoor space, as well as other advanced features.

3D modeling software that will allow users to easily diagram and model their indoor grow, while also locating where all the sensors and peripherals are. By collecting this data, it will allow for more seamless recipe sharing by providing additional context for where the sensors are in the grow.

In some embodiments of the present invention, a "Grow-Station" computer may be provided that may include the same, or similar, functionality as the GrowComputer 102. The GrowStation may be an off-grid weather station capable of tracking and storing hyper-local weather data for remote farmers around the world that is solar powered and connected using local cellular connections. The GrowStation may transmit local data to a central cloud service that, when in combination with numerous units, can create real time weather forecasts and data models for farmers. Alternatively or additionally, the GrowStation may communicate with one or more peripheral devices and/or sensors (e.g., the same as or similar to devices 104).

This embodiment of a GrowStation can, for example, use the entire GrowComputer stack, such as our sensors, Linux processors, power relay chips, and operating system to run the system.

Various implementations of the subject matter described herein, including Grow Computer and/or the cloud computer, can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications, or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (e.g., magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, a metropolitan area network, internet, intranet, Bluetooth network, infrared network, or any other network.

The computing system can include clients and servers. A client and server can be generally remote from each other and can interact through a communication network. The relationship of client and server can arise by virtue of computer programs running on the respective computers and having a client-server relationship with each other.

The processes described herein can be implemented by one or more data processors either within a single computing system or distributed among two or more computing systems. Related computer program products and computer systems are also described. The computer program products can comprise non-transitory computer readable media storing instructions, which when executed by at least one data processor of one or more computing systems, can cause the at least one data processor to perform operations herein. The computer systems may include one or more data processors and a memory coupled to the one or more data processors. The memory can temporarily or permanently store instructions that cause at least one processor to perform one or more of the operations described herein.

Although a few variations have been described in detail above, other modifications are possible. For example, the logic flows or sequences described herein do not require the particular order shown, or sequential order, to achieve desirable results. Further, the features described in different implementations are interchangeable and/or additive to create further implementations, which are also within the scope of this patent application. Other implementations are within the scope of the invention and are not limited by the examples of claims provided below. Additional claims based on these or other inventions described herein may be pursued at a later date.

What is claimed is:

1. An electronic device for automatic control of an indoor agriculture growing environment, the electronic device comprising:

computer memory;

a plurality of wireless communication interfaces comprising at least two of WiFi, Bluetooth, Zigbee, Xbee, TCP/IP, 3G, 4G, 5G, and LoRa and configured to receive, prior to the electronic device wirelessly pairing with a plurality of peripheral devices comprising at least two of a light for illuminating a grow product, a water pump for supplying water to the grow product, a fan for circulating air to the grow product, an air pump for oxygenating water for the grow product, a heater for increasing a temperature ambient to the grow product, and a chiller for decreasing the temperature ambient to the grow product, a pre-pairing data signal from each of the at least two of the plurality of peripheral devices identifying at least two of the device manufacturer, version, device type, distance, battery life, and timestamp information; and one or more processors coupled to the computer memory and configured to store in the computer memory a registry of all of the plurality of peripheral devices for which the pre-pairing data signal is received via the plurality of wireless communication interfaces, wherein the one or more processors is configured to:

identify and run computer program instructions comprising a recipe identifying environmental conditions for the grow product and for automating over a life cycle of the grow product control of the plurality of peripheral devices via the plurality of wireless communication interfaces;

receive via one of the plurality of wireless communication interfaces an additional pre-pairing data signal from an additional peripheral device, the additional pre-pairing data signal identifying at least two of the device manufacturer, version, device type, distance, battery life, and timestamp information for the additional peripheral device, store in the computer memory registry information regarding the additional peripheral device, and identify and run computer program instructions comprising a new recipe identifying environmental conditions for the grow product and for automating over a life cycle of the grow product control of the plurality of peripheral devices and the additional peripheral device via the plurality of wireless communication interfaces.

2. The electronic device of claim 1, wherein the one or more processors is configured to communicate with a server storing a plurality of recipes, and the one or more processors is configured to download the computer program instructions comprising the recipe for use with the plurality of peripheral devices from the server.

3. The electronic device of claim 1, wherein, subsequent to receiving the pre-pairing data signal for each of the plurality of peripheral devices, the one or more processors is configured to assign a unique identifier to each of the plurality of peripheral devices.

4. The electronic device of claim 3, wherein the one or more processors is configured to store each of the unique identifiers in the computer memory.

5. The electronic device of claim 4, wherein the one or more processors is configured to wirelessly transmit each of the unique identifiers to a corresponding peripheral device of the plurality of peripheral devices.

6. The electronic device of claim 1, wherein the one or more processors is configured to run the computer program instructions for controlling the plurality of peripheral devices after pairing with the plurality of peripheral devices via the plurality of wireless communication interfaces.

7. The electronic device of claim 1, wherein the one or more processors is configured to identify and run the computer program instructions comprising the new recipe subsequent to providing information regarding the additional peripheral device to a server storing a plurality of recipes and downloading the computer program instructions comprising the new recipe from the server.

* * * * *